United States Patent [19]
Nomura et al.

[11] Patent Number: 5,581,521
[45] Date of Patent: Dec. 3, 1996

[54] DEVICE FOR CONTROLLING THE MOTOR OF A RECORDING AND REPRODUCING APPARATUS

[75] Inventors: Masaru Nomura; Masaaki Hanano, both of Tenri; Takeshi Yamaguchi, Sakai; Shigeo Terashima, Tenri, all of Japan

[73] Assignee: Sharp Kabushiki Kaisha, Osaka, Japan

[21] Appl. No.: 428,965

[22] Filed: Apr. 25, 1995

[30] Foreign Application Priority Data

Apr. 27, 1994 [JP] Japan .................................. 6-090258
Jan. 20, 1995 [JP] Japan .................................. 7-007737

[51] Int. Cl.$^6$ ...................................................... G11B 7/00
[52] U.S. Cl. .................................. 369/32; 369/53; 369/55
[58] Field of Search ........................... 369/32, 54, 44.27, 369/53, 44.28, 55, 44.29

[56] References Cited

U.S. PATENT DOCUMENTS

| | | | |
|---|---|---|---|
| 4,607,358 | 8/1986 | Maeda et al. | 369/44.28 |
| 5,073,881 | 12/1991 | Akiyama | 369/44.28 |
| 5,084,661 | 1/1992 | Tanaka | 369/44.28 |
| 5,090,001 | 2/1992 | Ito et al. | 369/44.28 |
| 5,184,055 | 2/1993 | Ohishi et al. | 369/44.28 |
| 5,210,731 | 5/1993 | Katomata | 369/44.28 |
| 5,241,522 | 8/1993 | Yanagi | 369/44.28 |
| 5,257,255 | 10/1993 | Morimoto et al. | 369/53 |
| 5,285,431 | 2/1994 | Ogawa | 369/53 |
| 5,289,447 | 2/1994 | Kobayashi et al. | 369/44.28 |
| 5,398,221 | 3/1995 | Ogawa | 369/44.28 |

FOREIGN PATENT DOCUMENTS 3-293988  12/1991  Japan .

OTHER PUBLICATIONS

K. Ohnishi, *The Journal of the Institute of Electrical Engineers of Japan*, vol. 110, No. 8, 1990, pp. 657–660.

Primary Examiner—Nabil Hindi
Attorney, Agent, or Firm—David G. Conlin; Peter F. Corless; William J. Daley, Jr.

[57] ABSTRACT

The present invention is provided with a disturbance observer which outputs a compensating signal for compensating a driving signal of a linear motor in accordance with (1) an output signal of an acceleration sensor unit which mechanically detects an acceleration of the linear motor, the acceleration moving the optical pickup, and (2) the driving signal of the linear motor. A high pass filter which has a low frequency band cutoff frequency substantially same as that of the acceleration sensor unit is also provided on the path which is formed by connecting the input of the driving signal to the generated compensating signal in the disturbance observer. With the high pass filter, it is possible to prevent the linear motor from being driven too sensitively or too greatly by the disturbance observer due to the driving signal, vibrations, or shocks applied from outside, or noises from the acceleration sensor unit or the circuits, thereby avoiding the danger that the linear motor or the optical pickup is damaged.

13 Claims, 28 Drawing Sheets

FIG.10
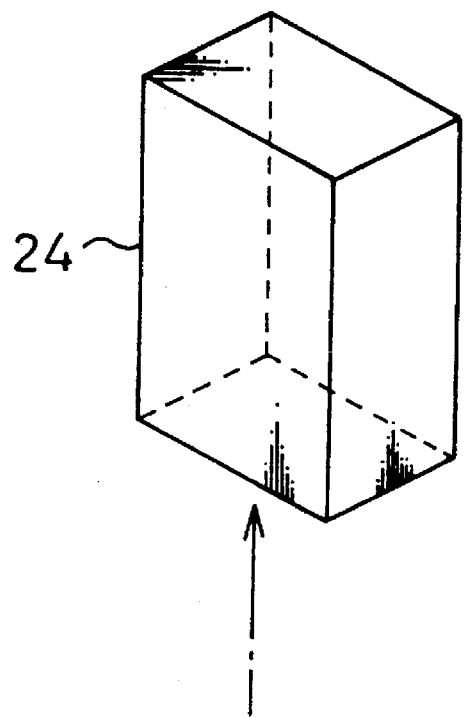
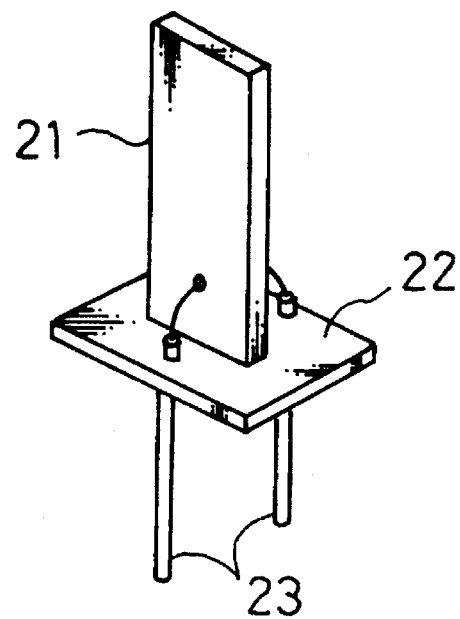

RELATIVE ACCELERATION
DETECTION OUTPUT
Va

RELATIVE ACCELERATION
DETECTION OUTPUT
Va

DEVICE FOR CONTROLLING THE MOTOR OF A RECORDING AND REPRODUCING APPARATUS

FIELD OF THE INVENTION

The present invention relates to a motor control device for servo control or access control of an apparatus such as an optical disk apparatus.

BACKGROUND OF THE INVENTION

In an optical disk apparatus and a magnetic disk apparatus, the tracking servo control or the access control is widely carried out. According to the tracking servo control, an optical pickup and an optical head, which are provided for recording and reproducing of information with respect to a disk medium, are positioned on a specific track of the disk. According to the access control, the optical pickup and the optical head are quickly moved to a target track. Thus, a motor mechanism is adopted for moving the optical pickup and the optical head in the radial direction of the disk.

The conventional optical disk apparatus, as shown in FIGS. 25(a), 25(b) and 26 for example, is arranged so that the optical disk 51 (an information recording medium) is rotated by a spindle motor 53, the spindle motor 53 being provided on a chassis 52. On the lower surface side of the optical disk 51, an optical pickup 54 is provided on the chassis 52 so as to move in the radial direction of the optical disk 51 (later described). The optical pickup 54 carries out recording and reproducing of information with respect to a track 51a on the optical disk 51 while projecting a laser beam 54a which is focused by an objective lens 55.

On the other hand, there is provided on the chassis 52 a permanent magnet 58, guide rails 59 and other members. Such an arrangement constitute a so-called motor mechanism, which is referred to as a linear motor 60, for moving the optical pickup 54 along the guide rails 59, i.e., in the radial direction of the optical disk 51 in accordance with a driving force which is generated by (1) a magnetic field which varies depending on a current applied to a driving coil 57 and (2) a magnetic field due to the permanent magnet 58.

There is provided an FPC (Flexible Printed Circuit) substrate 61 for carrying out inputting and outputting of a power supply current, a detected signal, and a control signal between the optical pickup 54 or the driving coil 57 and a control circuit (not shown). The members, such as the optical pickup 54, the bearings 56 and the driving coil 57, which are moved relatively to the chassis 52 are hereinafter referred to as a motor movable section 60a of the linear motor 60. In contrast, the members, such as the permanent magnet 58 and the guide rails 59, which are not moved relatively to the chassis 52 are hereinafter referred to as a motor stationary section 60b of the linear motor 60.

By the way, in the tracking servo control of the optical disk used as a computer memory apparatus, it is necessary to make the laser beam 54a follow up the track 51a, with an accuracy of not more than 0.1 micron, which displaces by a maximum of several tens of micro meters in accordance with the rotation of the optical disk 51.

Accordingly, the two-stage servo system is widely adopted in which the high accurate tracking servo control is carried out. According to the first stage of the two-stage servo system, the tracking is carried out by the fact that the optical pickup 54 is entirely moved by the linear motor 60 for components, having low frequencies and great amplitudes, of the displacement of the track 51a. According to the second stage of the two-stage servo system, the tracking is carried out by the fact that the objective lens 55 which converges the laser beam 54a is moved by a mechanism referred to as a lens actuator 54b inside the optical pickup 54 for components, having high frequencies and small amplitudes, of the displacement of the track 51a.

Therefore, in such a two-stage servo system, the optical pickup 54 is therein provided with a TES detecting circuit 54c which detects a position gap between the laser beam 54a and the track 51a on the optical disk 51 and outputs the detecting signal as a tracking error signal TES.

Moreover, there are provided a first phase compensating circuit 62 and a second phase compensating circuit 63 for respectively carrying out, with respect to the inputted tracking error signal TES, the appropriate amplifying and the appropriate giving of frequency characteristics. There are further provided a first driver 64 and a second driver 65 for respectively generating a driving current for the lens actuator 54b and for the linear motor 60 in response to the output signals from the respective first and second phase compensating circuits 62 and 63.

FIG. 27, for instance, shows an example of the servo gain curve of such a two-stage servo system. The lens actuator 54b is often arranged so that the objective lens 55 is supported by a spring. Such a case shows the characteristic of a spring-mass system having a resonance point at a frequency $f_A$ is shown.

Moreover, in order to ensure the stability of the servo system in the vicinity of the cutoff frequency fc at which the servo gain becomes 1, a phase lead compensation is carried out for the tracking error signal TES inputted in the frequency range from $f_3$ to $f_4$ by the first phase compensating circuit 62 of FIG. 26.

Since the linear motor 60 is arranged so that the optical pickup 54 is supported by bearings 56 so as to be movable therein, the linear motor 60 does not show the resonance characteristic in principle but shows the second-order integral characteristic of the inertial mass system.

It is difficult to follow up the high frequency components of the displacement of the track 51a since the size of the motor movable section 60a is greater compared with that of the lens actuator 54b. Moreover, unnecessary higher-order resonance modes are easy to occur since the size of the motor movable section 60a is greater compared with that of the lens actuator 54b. In order to meet the facts, the second phase compensating circuit 63 as shown in FIG. 26 is provided with a low pass filter which has a corner frequency at $f_{LPF}$.

Therefore, an affection dug to the foregoing unnecessary higher-order resonance modes at a frequency $f_D$ can be avoided. There is further provided a first-order low pass filter which has a corner (or pole) frequency at $f_1$ to improve the servo gain of the linear motor system in the low frequency range.

It is clear from this servo gain curve that the gain of the linear motor system is greater than that of the lens actuator system for the frequencies lower $f_x$, $f_x$ indicating an intersection frequency of the gain curve of the linear motor system and that of the lens actuator system. So, the linear motor 60 predominantly carries out the servo tracking for the frequencies lower than $f_x$. Since $f_x$ is set to several hundreds of Hz and the rotational frequency of the optical disk 51 is several tens of Hz, the linear motor 60 predominantly carries out the servo tracking for the low frequency components of the track 51a.

The most important reason why such a two-stage servo system is used lies in the fact that a demerit of the push-pull method, which is widely used for tracking error signal detection in the optical disk apparatuses, is relieved.

For example, as described at page 87 to 88 in "Hikari Disk Gijutsu" (Optical Disk Technology) issued by "Radio-Gijutsusha", in the case where the push-pull method is used for the tracking error detection, the following problem arises. More specifically, when the displacement of the lens actuator 54b is great, the tracking error signal does not become zero even if the position of the laser beam 54a coincides with that of the track 51a. Namely, a tracking offset due to a beam shift occurs, so the accurate tracking servo control cannot be carried out.

However, in the two-stage servo system, since the linear motor 60 follows up the displacement, having components of great amplitude and low frequency, of the track 51, the lens actuator 54b only has to follow up the displacement, having components of small amplitude and high frequency, of the track 51a. Thus, the demerit of the push-pull method is greatly relieved.

In the two-stage servo system, as already described, the linear motor 60 and the lens actuator 54b follow up the displacement of the track 51a in cooperation. This two-stage servo system does not work well unless both the characteristics of the linear motor 60 and that of the lens actuator 54b are in good conditions.

Since the lens actuator 54b is composed of compact and lightweight elements, the stiffness and accuracy of each element or the assembly accuracy is relatively high. Therefore, the characteristic distortion, due to undesired resonances at the foregoing elements' side, presents no serious problem. This is because even if such resonances occur, the resonance frequencies are likely to be enough higher than the frequency bandwidth (normally several kHz) required for the servo control.

In contrast, the linear motor 60 has a great size and heavy weight, various characteristic distortions may occur for the frequencies of not higher than several hundreds of Hz. Therefore, it is an important problem to keep the characteristics appropriate.

The characteristic distortions are likely to occur not only due to the higher-order resonance modes (occurring at frequency $f_D$), as shown in FIG. 27, but also due to the spring characteristic or non-linearity of the bearings 56 and the FPC substrate 61 which is provided for carrying out of the input and output of the power and the signals with respect to the optical pickup 54.

FIG. 28 shows an example of the transfer characteristic of the linear motor 60 by which the displacement of the motor movable section 60a varies depending on the applied driving current. When rolling-type bearings, for example, are used in the linear motor 60, it sometimes occurs that the bearings have an equivalent spring characteristic due to minute elastic deformation in a rolling contact surface. Thus, the resonance characteristic of the spring-mass system, due to this spring characteristic and the mass of the motor movable section 60a, is sometimes shown like the broken line of FIG. 28.

If there is not such a spring characteristic, the characteristic of the inertial mass system having simply a gain curve slope of –40dB/dec ought to be shown as the solid line of FIG. 28. However, in the case where the above-described resonance characteristic of the spring-mass system is shown, the response (that is, a servo gain) of the linear motor 60 for the frequencies lower than its resonance frequency $f_L$ is reduced. Such a spring characteristic also occurs due to the bending of the FPC substrate 61, and similarly the servo gain is reducued.

Ordinarily, the spring characteristic of the bearings 56 or the FPC substrate 61 is weak. So, even if the resonance occurs, the frequency $f_L$ due to the resonance is so low that there presents no problem. However, in the case where, for example, the pressure for the bearings 56 is increased in order to prevent the mechanic looseness of the bearings 56, $f_L$ becomes high, and the linear motor 60 is not concerned with the servo control any longer for the frequencies lower than $f_L$.

Moreover, sliding-type bearings made of fluorine resin (fluorine-contained polymers) or so are sometimes used as the bearings 56 instead of the rolling-type bearings in order to lower the size of the apparatus. In this case, the equivalent spring characteristic of the bearings 56 is easy to be greatly changed, i.e., the non-linearity of the spring characteristic is easy to occur remarkablly, due to the environmental temperature and the humidity or the displacement amount.

FIG. 29 shows an example of a servo gain curve of the two-stage servo system wherein the above-described sliding-type bearings 56 are used in the linear motor 60. The resonance frequency due to the mass of the motor movable section 60a and the equivalent spring characteristic of the bearings 56 is located at an enough low $f_L$ when the displacement of the track 51a is great. However, the resonance frequency becomes high up to $f_L'$ when the displacement of the trace 51a is small, and the servo gain for the frequencies lower than $f_L'$ is reduced.

If such a high resonance frequency occurs merely when the displacement is small, there presents no problem since the displacement of the track 51a to be followed up is small even if the servo gain is accordingly reduced.

However, due to the temperature or humidity, the movement of the sliding-type bearings 56 is sometimes made badly, and the bearings 56 are stuck in an extreme cases. In this case, $f_L'$ becomes extremely high so as to be in order of hundreds of Hz or a few kHz. Then, the servo gain is remarkably reduced regardless of the amount of the displacement of the track 51a.

Alternatively, the response of the linear motor 60 to the driving current, i.e., the sensitivity, changes due to (1) the difference of the magnetic attraction of the permanent magnet and the driving coil which are for giving the driving force to the linear motor 60 or (2) minute shape deformation thereof. The servo gain is affected by the change of such sensitivity. When the sensitivity is low, there presents a problem that the servo gain is so reduced that the following performance for the track 51a is educed. On the other hand, even if the sensitivity is high, there occurs another problem.

FIG. 30 shows an example of a servo gain curve of the two-stage servo system wherein the linear motor 60 whose sensitivity is so high as above described is used. The gain curve changes along the broken line of FIG. 30 in accordance with the improvement in the sensitivity.

At this time, it is likely to occur that the entire servo system including the lens actuator system will become unstable since the affection due to the higher-order resonance modes at $f_D$ in the above-described linear motor 60 becomes great.

This variation of the sensitivity also occurs due to the relative position of the motor movable section 60a to the motor stationary section 60b, the relative position being derived from the non-uniform magnetic flux distribution of the permanent magnet.

Moreover, there presents another problem different from the characteristic distortion and parameter variation.

Namely, in the case where some disturbances such as vibrations or shocks are applied to the apparatus, the linear motor 60 in the conventional optical disk apparatus or so is directly affected by them and the accuracy of the servo control is deteriorated.

Conventionally, some studies have been made for the problems that the bad affections occur due to the distortion characteristic including occurrence of the resonance, the variation of the sensitivity, or disturbances such as vibrations and shocks.

For example, in K. Onishi (the Journal of the Institute of Electrical Engineers of Japan vol.110, no.8 (1990), p.657–600), the study which aims controlling of the joint of the robot and intends to solve the above-described problem is reported.

According to the article, the deviation of the motor characteristic and response from the ideal ones, due to the characteristic distortion, the parameter variation, vibrations, and shocks, is all considered to be derived from the fact that the disturbance torque is applied to the motor. Accordingly, a so-called disturbance observer method, wherein the entire estimated disturbance torque is fed back to the motor, is disclosed in that article.

FIG. 31 shows a block diagram of the system using the above-described disturbance observer method, and FIG. 32 shows a block diagram of the system which is re-drawn by an equivalent conversion.

In the disturbance observer method in the system shown in FIG. 32, the right half configuration is for obtaining the entire torque $T_1$ which is applied to the motor, while the left half configuration is for obtaining a nominal value $T_2$ of the driving torque. The torque $T_1$ includes a driving torque $T_m$ and a disturbance torque $T_{dis}$, and is obtained by (1) converting the rotation velocity (angular velocity) ω which is detected by the sensor into the angular acceleration with approximate differentiation in the band whose upper angular frequency is g, and then (2) multiplying the angular acceleration by the reduced amount g during the approximate differentiation and the nominal value $J_n$ of the inertial moment. The nominal value $T_2$ is obtained by multiplying the driving current I of the motor by a nominal value Kτn of the torque constant.

The above-described disturbance observer method obtains the estimated value $T_{dis}'$ of the disturbance torque from the difference $(T_2-T_1)$ and multiplies this difference by a reciprocal of the nominal value Kτn of the torque constant so as to obtain a compensating current $I_{cmp}$ for canceling the above-described difference.

In the system using such a disturbance observer method, the above-described compensating current $I_{cmp}$ is added to a reference value $I_a^{ref}$ of the driving current for the motor so as to obtain the actual driving current for the motor, and the actual driving current is added to the motor so as to suppress the affections due to such as the distortion characteristic in the motor, the parameter variation, vibrations and shocks applied from outside.

Additionally, the low pass filter [g/(s+g)] in the left half configuration of the disturbance observer, obtained by the equivalent conversion, has no affection for the frequencies lower than the bandwidth g where the approximate differentiation is executed, and limits a band for the frequencies lower than the bandwidth g.

However, in case where the above-described conventional disturbance observer method is adopted to the motor control device for the information recording and reproducing apparatus, there presents a big problem as follows. Namely, first, as for a sensor for detecting the movement of the motor, a tacho generator detecting a rotation velocity (angular velocity) can be easily used since the above-described study deals with a rotation-type motor.

In order to add a similar sensor detecting the velocity to the linear motor 60 of a linear-moving type, as shown in FIG. 33, for example, the structure where a magnet 66 is attached to the chassis 52 and a detecting coil 67 is attached to the motor movable section 60*a* is conceivable.

Moreover, as shown in FIG. 34, another structure is conceivable, wherein a photo detector 68 for position detection is attached to the chassis 52 and a light emitting diode 69 is attached to the motor movable section 60*a*, and wherein a differentiator 70 for outputting a velocity by differentiating the displacement output detected by the photo detector 68.

However, the foregoing respective structures are bulky because of bridging the motor stationary section 60*b* and the motor movable section 60*a*. Therefore, the positioning accuracy of the elements installed on the motor stationary section 60*b* and the motor movable section 60*a* is very important in order to obtain the predetermined accuracy as a sensor.

Therefore, in the above-described sensor structures, their structures are complicated and the assembly requires much time, thereby presenting the problem that the costs are increased. Moreover, the above-described sensor structures are bulky, thereby causing to invite the danger of generating another unnecessary resonance due to the assembly.

FIG. 35 shows an example of a system using a disturbance observer in which a velocity sensor is used and the controlling is carried out with respect to a linear motor instead of a rotation-type (or rotary) motor. Variables or so are rewritten in FIG. 35 according to the linear motor 60. Additionally, a sensor required for detecting the velocity is illustrated by a block as Cs in FIG. 35, and the meanings of the variables or so in the figure are as follows.

$K_f$ :driving force (thrust) constant of the linear motor
M :mass of the linear motor movable section
$K_{fn}$ :nominal (reference) value of $K_f$
$M_n$ :nominal (reference) value of M
C :sensitivity of the velocity sensor
$F_m$ :driving force (thrust) of the linear motor
$F_{dis}$ :disturbance force (including parameter variations or so)
$F_{dis}'$ :estimated value of the disturbance force (including parameter variations or so)
$I_a^{ref}$ :reference value of the driving current to the linear motor
I :actual driving current for the linear motor
$I_{cmp}$ :current for compensating the disturbance force
x :displacement of the linear motor
s :Laplace operator
g :estimated band of disturbance of the observer (angular frequency)

There is a block having amplification degree of $(g \cdot M_n/C)$ as a gain term in the above-described system. As the bandwidth g of the approximate differentiator becomes greater, the ]]eater amplitude is required for the above-described block of $(g \cdot M_n/C)$.

For example, in order to obtain a good characteristic up to about 2 kHz in a linear motor of optical disk apparatuses, $g=2\pi \times 2000 \approx 12600$ is satisfied. However, it is not easy to realize an amplifier having such a high gain. Even if an OP (operational) amplifier is used as the above-described amplifier, the amplifier must have the frequency bands of not less than about 25 MHz, or the amplifier must be composed of a plurality of amplifiers in series.

Therefore, such amplifiers having wide bands are expensive, and such plural amplifiers are expensive since their configuration becomes complicated. Moreover, in the above-described structure having such a high gain, the following inconvenience occurs that the noises generated by the amplifier itself and externally applied noises are amplified in accordance with the amplification degree.

If ($M_n$/C) is reasonably small, the block of (g·$M_n$/C) can be composed of an amplifier having a low gain. However, in a linear motor of the optical disk apparatus, the mass M of the motor movable section 60a, which is ordinarily not so far from $M_n$, is about 0.01 kg at lightest, and the sensitivity of the velocity sensor is in the order of 0.01V/ms$^{-1}$ at most. Taking the fact into consideration, it cannot be expected that (g·$M_n$/C) becomes smaller than g.

Moreover, the approximate defferentiation [s/(s+g)] to the bandwidth g is carried out when estimating the disturbance torque based upon the detected velocity information. However, the differentiation emphasizes respective noises from the sensor, from the circuit, and from outside, so the motor control based upon the fact causes waste of electric power and heating of the motor itself, and causes unnecessary vibrations and noises in the motor.

The characteristic distortion, the parameter variation, vibrations, and shocks can be absorbed and compensated up to the bandwidth g where the defferentiation is carried out. But if the bandwidth g is expanded, the influence of the noises becomes great accordingly.

As shown in FIG. 27, for the linear motor 60 in the optical disk apparatus, good characteristic is necessary up to the frequency band of three or four times as much as $f_X$, which is a frequency at the intersection of both the gain curve of the linear motor system and that of the lens actuator system. For example, when $f_X$ is 500 Hz, it is desirable to suppress the occurrence of the characteristic distortion and to absorb the bad affection of the characteristic distortion or so up to about 2 kHz. However, it is hard to realize the peripheral circuits which include a velocity sensor or a differentiator and have few noises up to such a frequency band.

Moreover, considering that a block having a great gain of ($M_n$/C) as above-described is necessary, the above-described problem of noises of the velocity sensor or the differentiator becomes more serious.

SUMMARY OF THE INVENTION

An object of the present invention is to provide a motor control device for an information recording and reproducing apparatus, (1) in which a disturbance observer can suppress the characteristic distortion of higher-order resonance modes or so, parameter variation, vibrations and shocks applied from outside, (2) which is compact and lightweight and does not necessitate the high accurate positioning, (3) which does not necessitate the differentiation in the disturbance observer and is excellent in the noise aspect, and (4) which is excellent in realizablity by the circuits or so.

In order to achieve the foregoing objects, the first motor control device for an information recording and reproducing apparatus in accordance with the present invention is characterized by having:

reproducing means for reading out information from a disk-type recording medium;

a motor, having a motor movable section which is moved integrally with the reproducing means and a motor stationary section, for moving the reproducing means along a recording surface of the disk-type recording medium, the motor being driven in accordance with a driving current;

an acceleration detecting means for detecting a relative acceleration, of the reproducing means and the motor movable section, with respect to the motor stationary section; and a disturbance observer for generating a compensating signal which compensates a disturbance force and characteristic variation applied to the motor in response to the driving current and an acceleration signal of the acceleration detecting means, and for correcting the driving current in response to the compensating signal.

With the arrangement, the acceleration of the reproducing means which has moved along the recording surface of the disk-type recording medium is directly detected by the acceleration detecting means. Since the disturbance observer is provided for estimating a disturbance or so in accordance with the acceleration signal of the acceleration detecting means and the driving current of the motor, it is possible to omit the differentiation operation in the disturbance observer, thereby reducing affections of the noises due to the velocity sensors or peripheral circuits.

Moreover, since it is possible to omit the differentiation operation, an amplifier having high gains in proportion to the frequency bandwidth in which the differentiation operation is carried out is not required, thereby realizing the circuit easily.

Therefore, since the first motor control device is provided with the acceleration detecting means, the disturbance observer can be realized easily without affections of the noises and without an amplifier having a specific great amplification degree.

For this reason, the foregoing arrangement can easily have an excellent characteristic, that the affections due to the characteristic distortion and parameter variation in the motor, and the vibrations and the shocks applied from outside can be suppressed throughout the wide frequency bandwidth in the transfer characteristic.

Moreover, since the acceleration detecting means detects the relative acceleration, the acceleration of the motor movable section with respect to the motor stationary section can be accurately detected during the motor driving upon receipt of the vibrations and shocks or upon receipt of the reactions of the motor stationary section from the motor movable section.

Therefore, the reproducing means which moves integrally with the movable section can move more accurately with respect to the disk-type recording medium, thereby improving the operation characteristic of the reproducing means.

The second motor control device for an information recording and reproducing apparatus in accordance with the present invention is characterized in that the acceleration detecting means of the first motor control device includes a piezoelectric element for converting an amount of mechanical deformation due to the acceleration into an electric signal.

With the arrangement, the acceleration detecting means can be realized by installing the piezoelectric element, which is configured by a compact, strong, and single element, only with respect to the motor movable section. Moreover, since the piezoelectric element can easily be further compact and lightweight, the acceleration detecting means can be made more compact and lightweight. Therefore, the structure of the periphery of the motor including the acceleration detecting means can be made simple and its size can be made compact.

Therefore, with the arrangement, the limitation relating to the installing position of the piezoelectric element and its positioning accuracy can be ramarkablly relieved compared with the conventional case where each element of the detecting means is provided for both the motor movable section and the motor stationary section separately so as to detect the velocity or the displacement. Accordingly, it is possible to reduce time and labor for installing, to increase the flexibility in designing the motor, and to reduce the occurrence of the resonance modes or so due to the installment of the piezoelectric element.

For this reason, such an arrangement has an effect that it is possible to reduce the cost by reducing the above-described limitation and the time and labor. Moreover, it is possible to improve the operation characteristic of the reproducing means which is moved by the motor by reducing the occurrence of the resonance modes or so.

The third motor control device for an information recording and reproducing apparatus in accordance with the present invention is characterized by comprising:

recording and reproducing means for recording or reading out information to or from a disk-type recording medium, and for generating a control signal by which the recording and reproducing means is controlled;

a motor for moving the recording reproducing means along a recording surface of the disk-type recording medium in response to a driving signal which varies depending on the control signal;

acceleration detecting means for detecting an acceleration of the recording reproducing means which is moved by the motor;

a disturbance observer, having a first path connecting the driving signal to the generated compensating signal and a second path connecting the acceleration signal detected by the acceleration detecting means to the generated compensating signal, for estimating and generating a compensating signal for compensating a disturbance force applied to the motor and characteristic variation of the motor in accordance with the driving signal and the acceleration signal;

adding means for correcting the control signal in accordance with the compensating signal of the disturbance observer so as to generate the driving signal; and adjusting means, provided on the first path, having a low frequency band cutoff characteristic substantially equal to a low frequency band cutoff characteristic of the acceleration detecting means.

With the arrangement, in the disturbance observer, the adjusting means is provided on the first path which is formed by connecting the driving signal of the motor to the generated compensating signal, the adjusting means having a low frequency band cuttoff frequency substantially equal to a low frequency band cuttoff frequency of the acceleration detecting means (a sensor sytem or so). Therefore, when the signals having the frequencies lower than the low frequency band cutoff frequency, (that is, having frequencies lower than the low frequency band cutoff characteristic,) are applied with respect to the first path, the signals being generated due to the driving signal and the vibration and shock which are applied from outside, or due to the noises of the acceleration detecting means and circuits, the signal can be eliminated by the adjusting means.

Therefore, since the adjusting means can avoid the operation error due to the foregoing signal in the disturbance observer, it is avoidable that the motor is driven too sensitively or too greatly in accordance with the above-described signal. Accordingly, it is possible to prevent the danger to damage the motor or the recording and reproducing means, which is moved by the motor, such as an optical pickup or a head.

BRIEF DESCRIPTION OF THE DRAWINGS

FIG. 10 is an analyzed perspective view showing the acceleration sensor of the motor control device.

DETAILED DESCRIPTION OF THE PREFERRED EMBODIMENTS

[FIRST EMBODIMENT]

Refering to FIGS. 1 through 12, the following description will discuss the first embodiment of the present invention.

Figure 1:
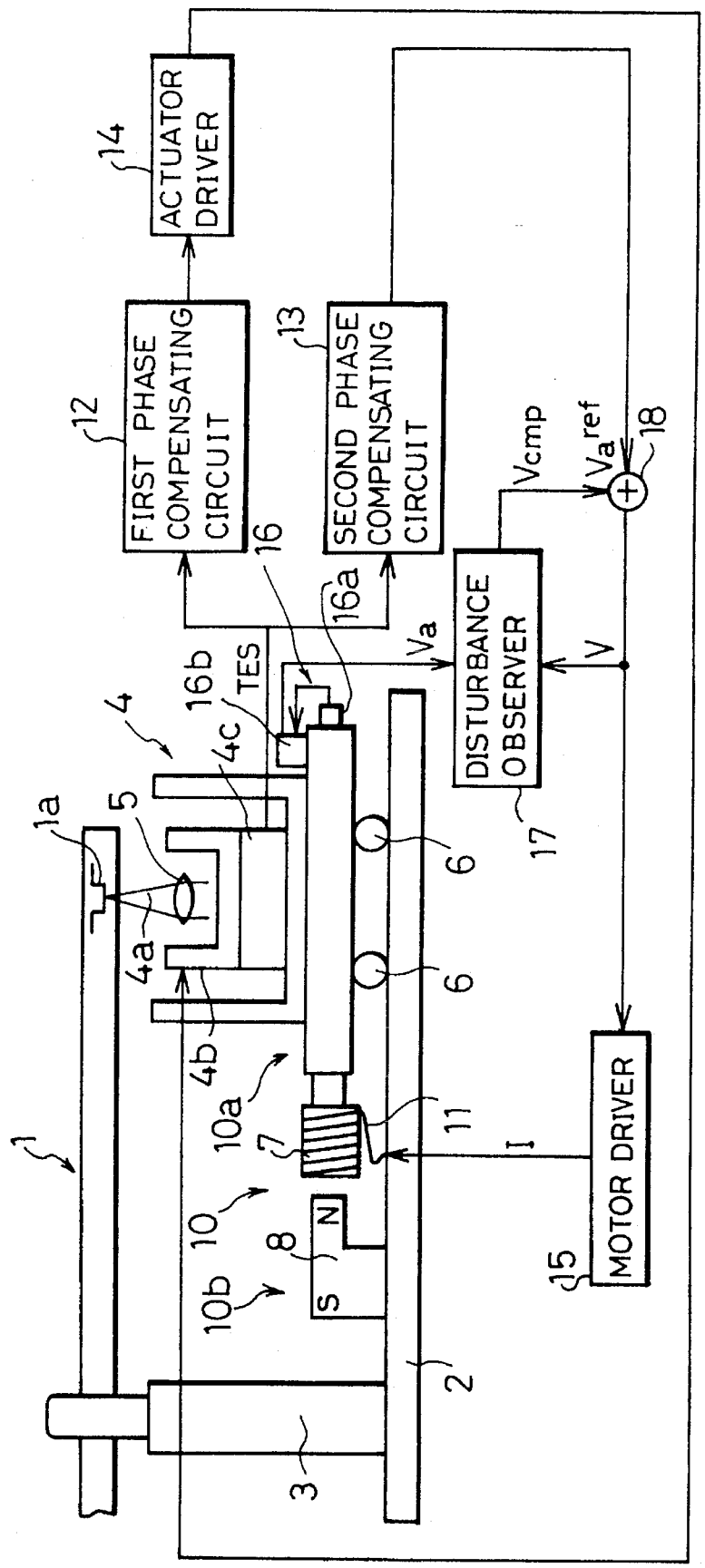
FIG. 1 is a view showing the structure of the first embodiment of a motor control device for an information recording and reproducing apparatus of the present invention.

As shown in FIG. 1, in the motor control device for the information recording and reproducing apparatus, a spindle motor 3, for rotating an optical disk (disk-type recording medium) 1, which is a recording medium of information, is provided on a chassis 2. On the lower side of the optical disk 1, as described later, an optical pickup (a recording reproducing means) 4 is provided on the chassis 2 so as to move in the radial direction of the optical disk 1.

The optical pickup 4 carries out recording and reproducing of information with respect to a track 1a on the optical disk 1 while projecting a laser beam 4a which is focused by an objective lens 5.

On the other hand, there are provided on the chassis 2 a permanent magnet 8, guide rails (not shown) and other members. Such an arrangement constitute a linear motor (motor) 10, for moving the optical pickup 4 along the guide rails, i.e., in the radial direction of the optical disk 1 in accordance with a driving force which is generated by (1) a magnetic field which varies depending on a current applied to a driving coil 7 and (2) a magnetic field due to the permanent magnet 8. The linear motor 10 is a d.c. linear motor using the electro-magnetic force.

There is provided an FPC substrate 11 for carrying out inputting and outputting of power supply currents, detected signals, and control signals between the optical pickup 4 or the driving coil 7 and a control circuit (not shown). The members, such as the optical pickup 4, the bearings 6 and the driving coil 7, which are moved relatively to the chassis 2 are hereinafter referred to as a motor movable section 10a of the linear motor 10. In contrast, the members, such as the permanent magnet 8 and the guide rails, which are not moved relatively to the chassis 2 are hereinafter referred to as a motor stationary section 10b of the linear motor 10.

By the way, in the tracking servo control of the optical disk used as a computer memory apparatus, it is necessary to make the laser beam 4a follow up the track 1a, with an accuracy of not more than 0.1 micron, which displaces by a maximum of several tens of micro meters in accordance with the rotation of the optical disk 1.

Accordingly, the two-stage servo system is widely adopted in which the high accurate tracking servo control is carried out. According to the first stage of the two-stage servo system, the tracking is carried out by the fact that the optical pickup 4 is entirely moved by the linear motor 10 for components, having low frequencies and great amplitudes, of the displacement of the track 1a. According to the second stage of the two-stage servo system, the tracking is carried out by the fact that the objective lens 5 which converges the laser beam 4a is moved by a mechanism referred to as a lens actuator 4b inside the optical pickup 4 for components, having high frequenciesy and small amplitudes, of the displacement of the track 1a.

Therefore, in such a two-stage servo system, the optical pickup 4 is therein provided with a TES detecting circuit 4c which detects a position gap between the laser beam 4a and the track 1a on the optical disk 1 and outputs the detecting signal as a tracking error signal TES.

Moreover, there are provided a first phase compensating circuit 12 and a second phase compensating circuit 13 for respectively carrying out, with respect to the inputted tracking error signal TES, the appropriate amplifying and the appropriate giving of frequency characteristics.

Moreover, there is provided an actuator driver 14 for generating a lens control signal in response to the signal outputted from the first phase compensating circuit 12 so as to drive the lens actuator 4b. The lens control signal is outputted to the lens actuator 4b.

Here, as not shown, a tracking error signal TES is transmitted from the TES detecting circuit 4c to each phase compensating circuit 12 and 13 through the FPC substrate 11. Similarly, the control signal is transmitted from the actuator driver 14 to the lens actuator 4b through the FPC substrate 11, too.

The motor movable section 10a is provided with an acceleration sensor 16a for mechanically detecting the acceleration of the motor movable section 10a. There is further provided a buffer amplifier 16b, in the vicinity of the acceleration sensor 16a, for outputting an output signal of the acceleration sensor 16a with low output impedance, that is, for making buffer amplifying.

Figure 2:
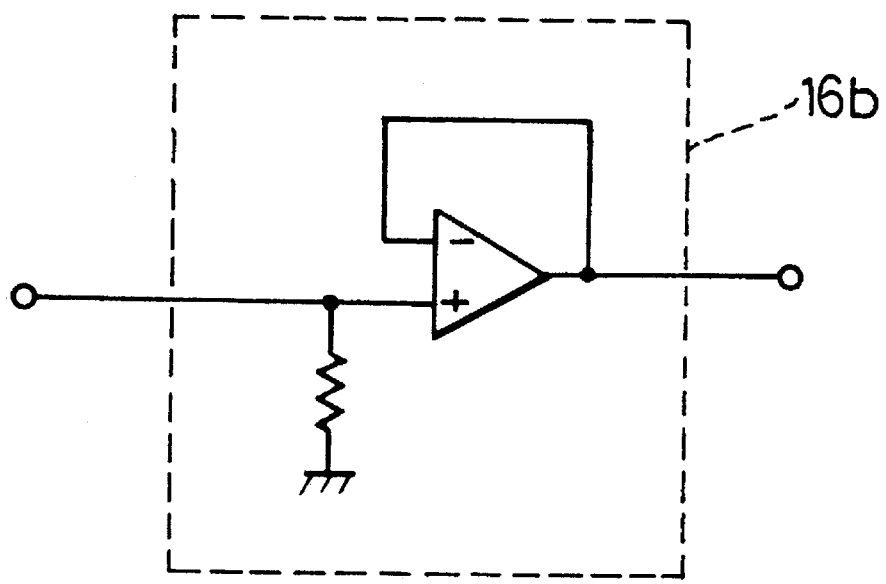
FIG. 2 is a view showing the structure of a buffer amplifier used for an acceleration sensor of the above-described motor control device.

As shown in FIG. 2 for example, the buffer amplifier 16b is composed of a voltage follower using an operational amplifier (hereinafter referred to as an OP amplifier), and an input resistor through which a bias current of the OP amplifier flows. The combination of the acceleration Sensor 16a and the buffer amplifier 16b is hereinafter called an acceleration sensor unit (an acceleration detecting means) 16.

As shown in FIG. 1, there is further provided a disturbance observer 17 for correcting the output signals of the second phase compensating circuit 13 which varies depending on the tracking error signal TES in response to the signal from the acceleration sensor unit 16.

There is further provided an adder (adding means) 18 for outputting a corrected driving voltage V by adding a compensating signal $V_{cmp}$ of the disturbance observer 17 to a driving voltage reference $V_a^{ref}$, $V_a^{ref}$ indicating an output signal of the second phase compensating circuit 13. There is provided a motor driver 15 for converting the driving voltage V of the adder 18 to a driving current I.

When the disturbance observer 17 receives an acceleration signal $V_a$ of the acceleration sensor unit 16 and the driving voltage V, a disturbance ($F_{dis}$) is estimated based on the acceleration signal $V_a$ and the driving voltage V. Then the compensating signal $V_{cmp}$ for compensating the disturbance is generated and outputted to the adder 18.

Various devices can be used for the motor driver 15 provided that the inputted driving voltage V (in volt) is converted to the corresponding driving current I (in ampere) for supplying to the linear motor 10 so as to drive the linear motor 10, i.e., provided that the dimension of the inputted signal is converted from voltage to current and is outputted while keeping the transfer gain of 1.

Here, since the motor driver 15 only converts the dimension from voltage to current while keeping its transfered gain of 1 as above-described. Therefore, hereinafter, as far as it is not required, the driving voltage V inputted to the disturbance observer 17, the compensating signal $V_{cmp}$ inputted from the disturbance observer 17 to the adder 18, and the driving voltage reference value $V_a^{ref}$ inputted from the second phase compensating circuit 13 to the adder 18 are respectively regarded as I, $I_{cmp}$, and $I_a^{ref}$ which have respective current dimensions.

Figure 3:
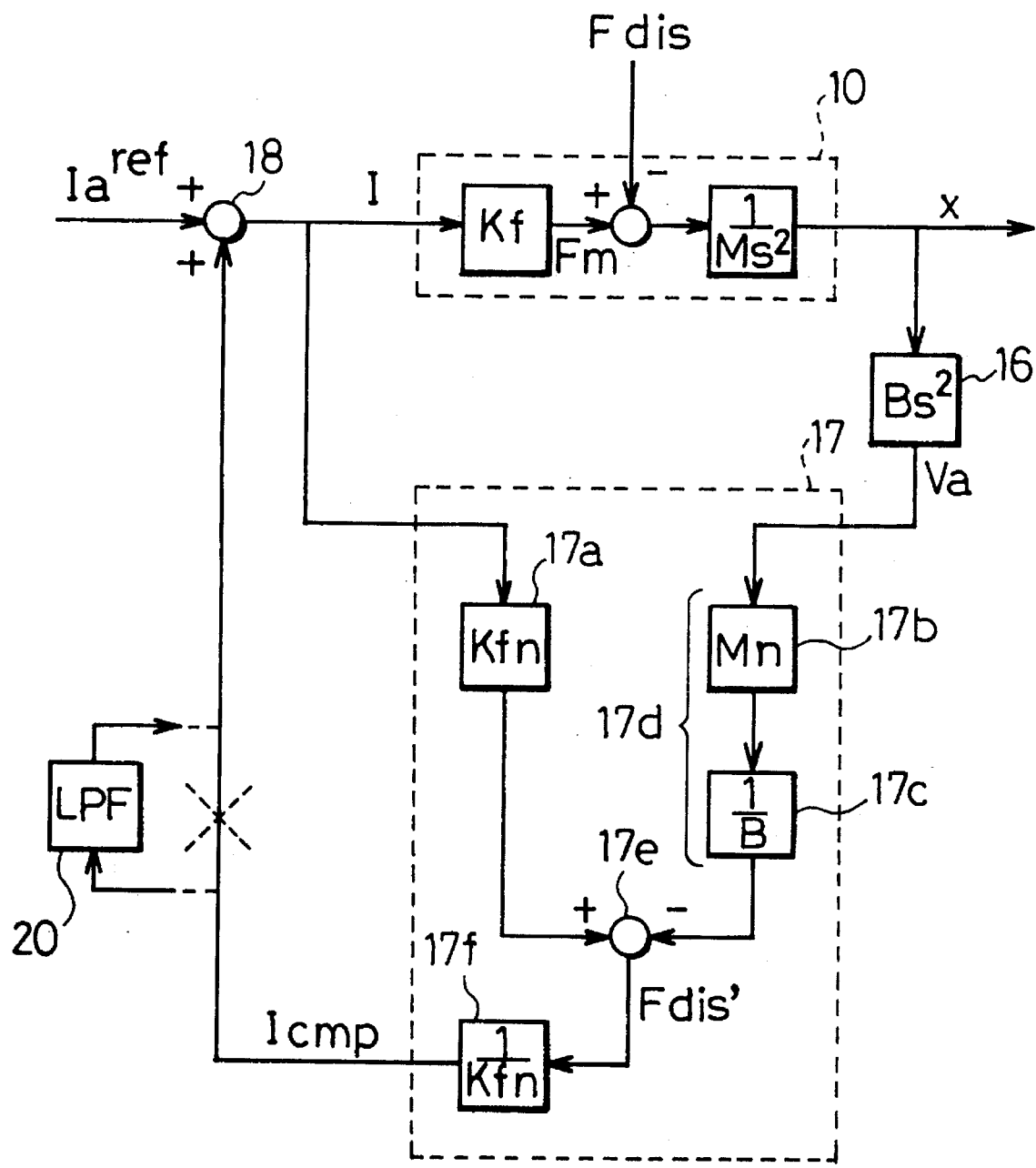
FIG. 3 is a block diagram showing a control mechanism of the above-described motor control device.

FIG. 3 is a block diagram showing a main portion of the above-described motor control device, and the variables or so in the FIG. 3 indicate as follows.

$K_f$ :driving force (thrust) constant of the linear motor
M :mass of the linear motor movable section
$K_{fn}$ :nominal (reference) value of $K_f$
$M_n$ :nominal (reference) value of M
B :sensitivity of the acceleration sensor
$F_m$ :driving force (thrust) of the linear motor
$F_{dis}$ :disturbance force (including parameter variations or so)
$F_{dis}'$ :estimated value of the disturbance force (including parameter variations or so)
$I_a^{ref}$ :reference driving current to the linear motor
I :actual driving current to the linear motor
$I_{cmp}$ :current for compensating the disturbance force
X :displacement of the linear motor
s :Laplace operation In FIG. 3, the transfer characteristic of the linear motor 10 is indicated as the second-order integral system relating to the driving force constant $K_f$ of the linear motor 10 and the mass M of the linear motor movable section 10a.

Here, the acceleration sensor unit 16 as acceleration detecting means has a sensitivity B. Since the acceleration is detected according to the displacement x of the linear motor 10, the acceleration sensor unit 16 is represented as $Bs^2$ by multiplying the sensitivity B by $s^2$ which means second-order differentiation. Note that the acceleration sensor unit 16 does not actually execute the differentiation. The term $s^2$ is given based on the fact that the acceleration which is obtained from the second-order differentiation of the displacement is detected.

Figure 4:
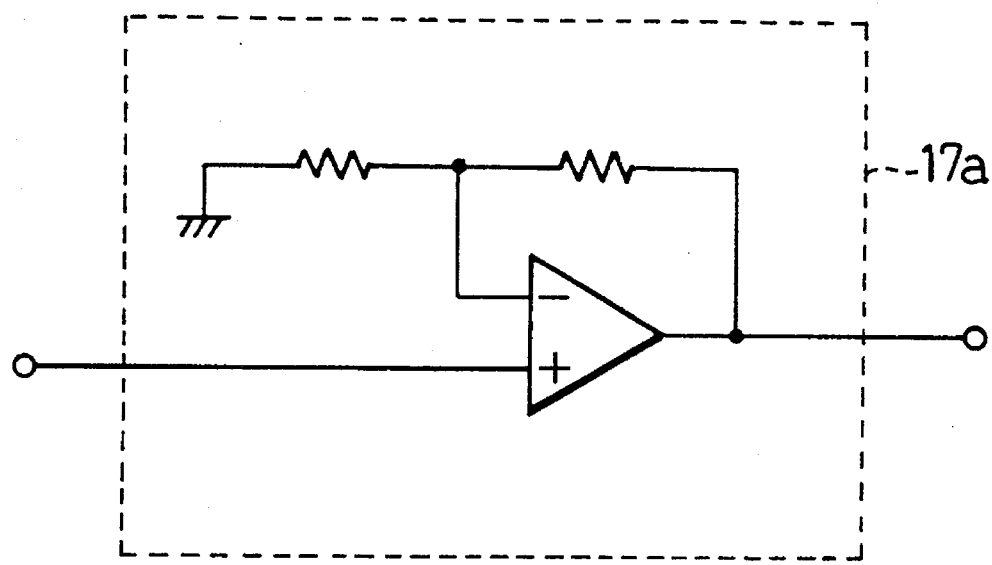
FIG. 4 is a view showing an example in which the first block of the disturbance observer in the above-described control system is configured by an electronic circuit.

The disturbance observer 17 is provided with a first block 17a. The first block 17a has an amplifier, configured by an electronic circuit, having a frequency characteristic which covers from the inputted driving current I to the nominal value $F_n$ of the driving force, i.e., having a gain corresponding to the nominal value $K_{fn}$ of the driving force constant. More specifically, the first block 17a may be composed of a non-inverting amplifying circuit using an OP amplifier, as shown in FIG. 4 for example.

The disturbance observer 17 is provided with an amplifier 17b for amplifying the inputted acceleration signal $V_a$ in accordance with the gain $M_n$. The amplifier 17b has a ideal frequency characteristic which covers from the driving force $F_m$ of the linear motor 10 to an acceleration ($s^2 \cdot x$).

The disturbance observer 17 is provided with an amplifier 17c, which has a gain 1/B, i.e., the reciprocal of the sensitivity B of the acceleration sensor unit 16, for amplifying the output of the amplifier 17b. A second block 17d is composed of the amplifier 17b and the amplifier 17c.

Figure 5:
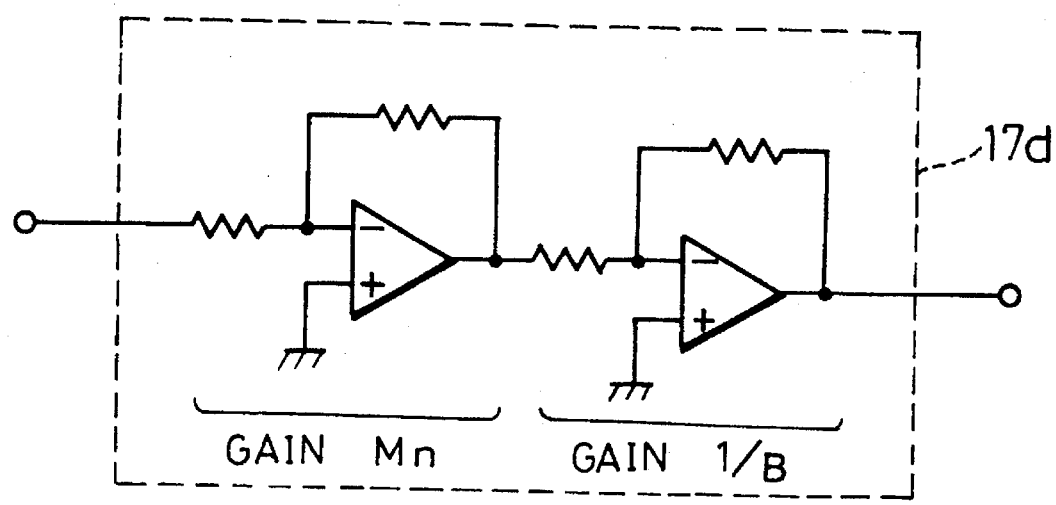
FIG. 5 is a view showing an example in which the second block of the disturbance observer is configured by an electronic circuit.

When the parameters of the linear motor 10 are the nominal values, the second block 17d estimates forces, including the disturbance forces $F_{dis}$, applied to the linear motor 10 in response to the acceleration signal Va which is detected by the acceleration sensor unit 16. For example, as shown in FIG. 5, the second block 17d is configured by connecting two inverting amplifying circuits in series, the two inverting amplifing circuits having respective gains of $M_n$ and (1/B).

Figure 6:
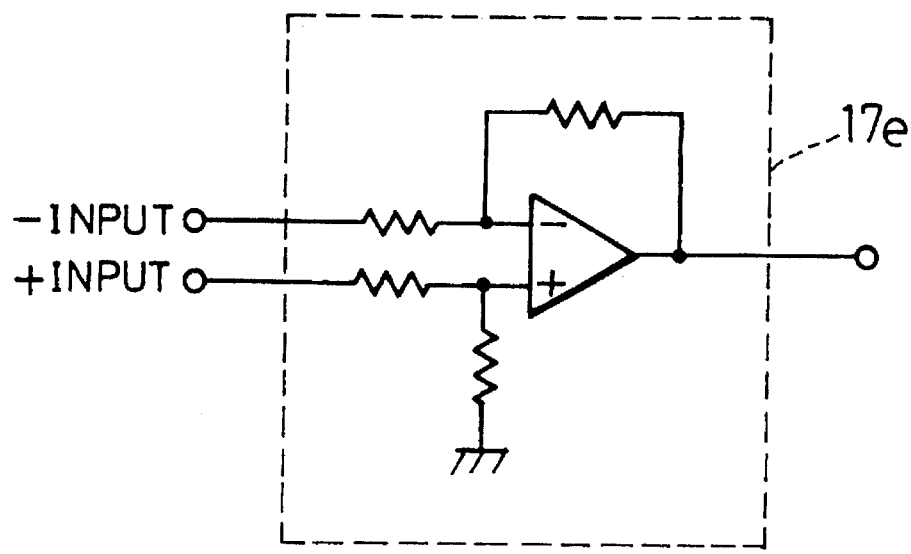
FIG. 6 is a view showing an example in which a comparator of the disturbance observer is configured by an electronic circuit.

The disturbance observer 17 is provided with a comparator 17e to which the respective outputs of the first block 17a and of the second block 17d are inputted and which compares the outputs so as to output a detected difference therebetween. The comparator 17e estimates the value $F_{dia}'$ of the disturbance force including the parameter variations of the linear motor 10 and output it. The comparator 17e may be configured by a differential amplifying circuit using an OP amplifier, as shown in FIG. 6 for example.

The disturbance observer 17 is provided with a third block 17f to which the output from the comparator 17e is inputted. The third block 17f is an amplifier having the frequency characteristic opposite to that of of the first block 17a, i.e., having a gain of the reciprocal of the nominal value of the driving force constant ($1/K_{fn}$). The third block 17f generates and outputs the disturbance force compensating current $I_{cmp}$, for compensating the reference driving current $I_a^{ref}$ to the linear motor, in accordance with the estimated value $F_{dis}'$ of the disturbance force so as to cancel the estimated value $F_{dis}'$ of the disturbance force.

Figure 7:
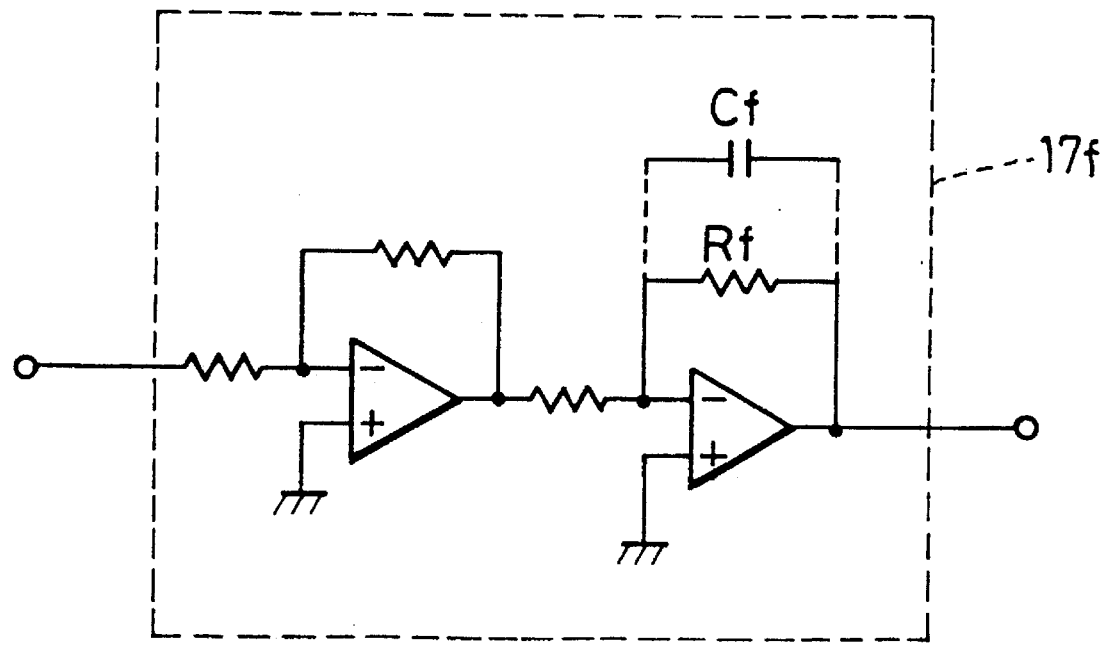
FIG. 7 is a view showing an example in which a third block of the disturbance observer is configured by an electronic circuit.

As shown in FIG. 7, the third block 17f is configured by connecting first and second inverting amplifing circuits (using two OP amplifiers) in series. A capacitor $C_f$ is connected in parallel with respect to the feedback resistor $R_f$ of the second inverting amplifying circuit (see the broken line of FIG. 7) when the characteristic of the later described LPF 20 is provided in the third block 17f.

Figure 8:
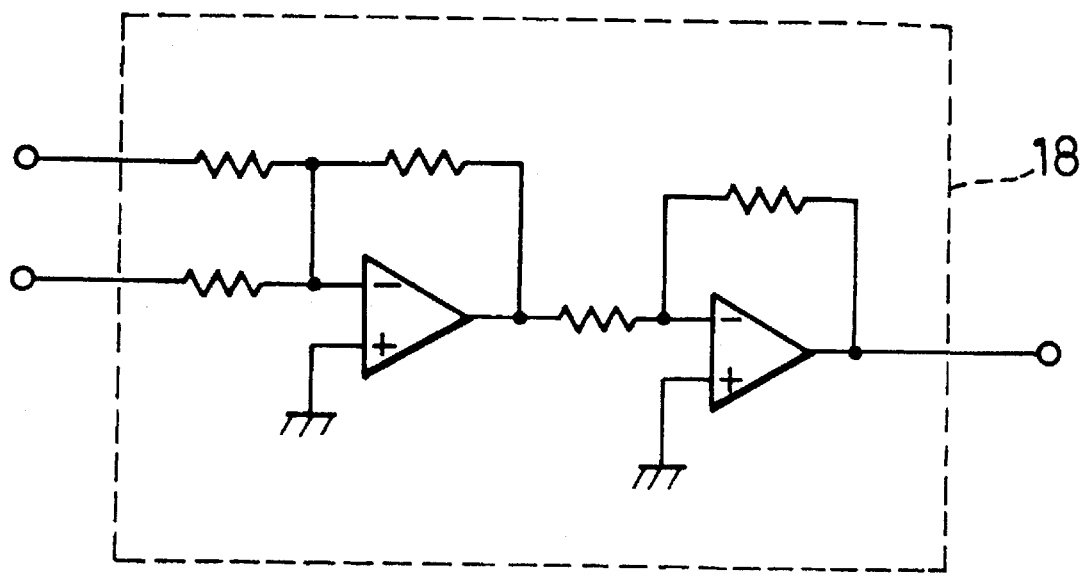
FIG. 8 is a view showing an example in which an adder of the motor control device is configured by an electronic circuit.

The adder 18 adds (1) the current $I_{cmp}$ which is required for compensating the disturbance force including parameter variations to (2) the reference driving current. $I_a^{ref}$ of the second phase compensating circuit 13 so as to output the added result, i.e., the driving current I to both the linear motor 10 and the first block 17a in the disturbance observer 17. As shown in FIG. 8, for example, the adder 18 is configured by connecting an inverting adder circuit and a inverting amplifying circuit in series, both amplifying circuits using an OP amplifier.

An LPF (low pass filter) 20 may be provided between the third block 17f and the adder 18 in accordance with the need. It is possible to limit the frequency bandwidth of the disturbance observer 17 in accordance with the need as described later by using the LPF 20.

Figure 9:
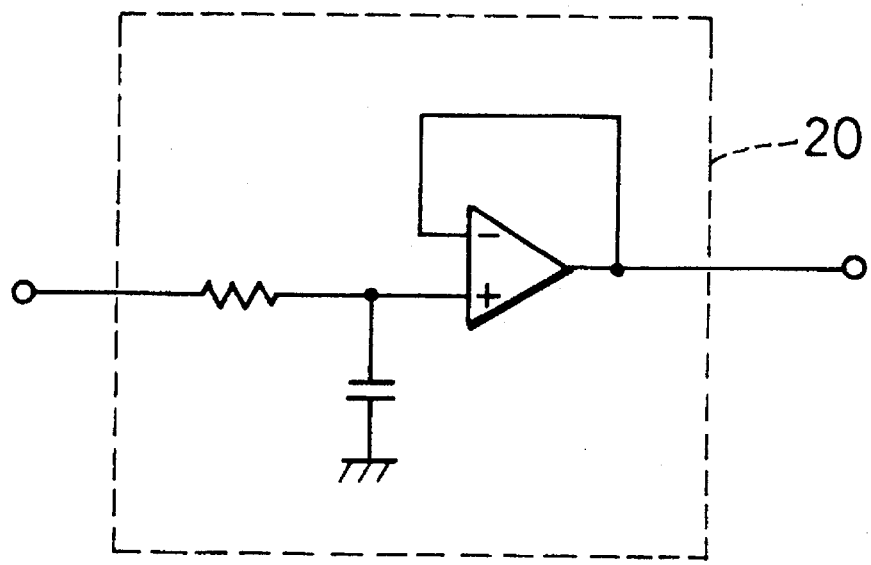
FIG. 9 is a view showing an example in which an LPF of the disturbance observer is configured by an electronic circuit.

As shown in FIG. 9, the LPF 20 may be configured by connecting a primary low pass filter composed of a resistor and a capacitor to the input of the voltage follower of the OP amplifier. However, as shown in FIG. 7, the configuration is also possible that the capacitor $C_f$ is connected in parallel with respect to the feedback resistor $R_f$ as shown with the broken line in the second inverting amplifying circuit of the third block 17f so that the LPF 20 includes the characteristic of the LPF. In such a case, the circuit shown in FIG. 9 is not necessary.

Next, in order to confirm the operation principle of the first embodiment, the following equations (1) to (4) are made, taking variables in each part into consideration.

$$F_{dis}' = K_{fn} \cdot I - (M_n/B) \cdot B s^2 \cdot x \tag{1}$$

$$I = I_a^{ref} + I_{cmp} \tag{2}$$

$$I_{cmp} = (1/K_{fn}) \cdot F_{dis}' \tag{3}$$

$$x = [1/(M \cdot s^2)] \times (K_f I - F_{dis}) \tag{4}$$

The equation (1) is substituted to the equation (3).

$$I_{cmp} = I - (M_d/K_{fn}) \cdot s^2 \cdot x \tag{5}$$

The equation (4) is substituted to the equation (5).

$$I_{cmp} = I - [(K_f M_n)/(K_{fn} \cdot M)] \cdot I + [M_n/(K_{fn} \cdot M)] \cdot F_{dis} \tag{6}$$

The equation (6) is substituted to the equation (2) and the equation is rearranged.

$$I = [(K_{fn}/M_n)/(K_f/M)] \cdot I_a^{ref} + (1/K_f) \cdot F_{dis} \tag{7}$$

The equation (7) is substituted to the equation (4).

$$\begin{aligned} x &= [K_f/(M \cdot s^2 \cdot K_f)] \cdot F_{dis} - \\ & [1/(M \cdot s^2)] \cdot F_{dis} + \\ & [K_f/(M \cdot s^2)] \times \\ & [(K_{fn}/M_n)/(K_f/M)] \cdot I_a^{ref} \\ &= [(K_{fn}/(M_n \cdot s^2)] \cdot I_a^{ref} \end{aligned} \tag{8}$$

As is clear from the equation (8), the displacement x of the linear motor 10 with respect to the reference driving current $I_a^{ref}$ from outside is sure to clearly be defined by the nominal value $K_{fn}$ of the driving force constant and the nominal value $M_n$ of the mass of the motor movable section 10a, and is not affected by the parameters $K_f$ and M of the real linear motor 10.

In other words, this ensures that the displacement x does not receive any affections of the actual parameter variations.

Thus, the affections of the spring characteristic due to the bearings 6 and the FPC substrate 11 are suppressed.

For example, it is assumed that the linear motor 10 actually has the spring characteristic and mass system characteristic. In such an assumption, when the equation (4) is replaced with the following equation (4)', the same result is obtained. Finally, the bad affections which are generated equivalently due to viscosity and spring characteristic are suppressed and eliminated.

$$x = [1/(M \cdot s^2 + D \cdot s + K)] \times (K_f I - F_{dis}) \tag{4}$$

Here, D indicates an equivalent coefficient of viscosity occurring in the bearings 6 and the FPC substrate 11, and K indicates an equivalent spring constant occurring in the bearings 6 and the FPC substrate Moreover, the equation (8) does not have any terms concerning the disturbance force $F_{dis}$, so the equation (8) also shows that the displacement x does not receive any affections of disturbance including vibrations, shocks, nonlinearity or so.

The example, in which the acceleration sensor 16a is used in the disturbance observer 17, is disclosed in the first embodiment. However, any devices, which convert mechanical deformation, i.e., the degree of distortion to an electric signal in response to the magnitude of acceleration, may be substituted for the foregoing acceleration sensor 16a.

The structure of the acceleration sensor 16a is shown in FIG. 10 for example. Namely, the acceleration sensor 16a has a piezoelectric element 21 which is a small piece having a thickness of about 0.2 mm, a length of a few mm and a shape of a substantially rectangular plate. The acceleration sensor 16a has a supporter 22 which is supporting means for supporting the piezoelectric element 21 and has a shape of a substantially rectangular plate. The piezoelectric element 21 is installed on one surface of the supporter 22 so that one end in the longitudinal direction is supported. The piezoelectric element 21 is supported so as to stand substantially perpendicular to the supporter 22.

On the other surface of the supporter 22, there is provided a pair of terminals 23 respectively connected to the electrode surfaces of the piezoelectric element 21. There is provided a cap 24 for protecting the piezoelectric element 21 which is attached to the supporter 22 so as to cover the piezoelectric element 21.

The acceleration sensor 16a is installed in the motor movable section 10a so that the thickness direction of the piezoelectric element 21 becomes along the moving direction of the motor movable section 10a. Moreover, the above-described acceleration sensor 16a can mechanically detect the acceleration of the motor movable section 10a and can reduce the size and weight of the the acceleration sensor 16a, since it is composed of the small piece of the piezoelectric element 21.

Figure 33:
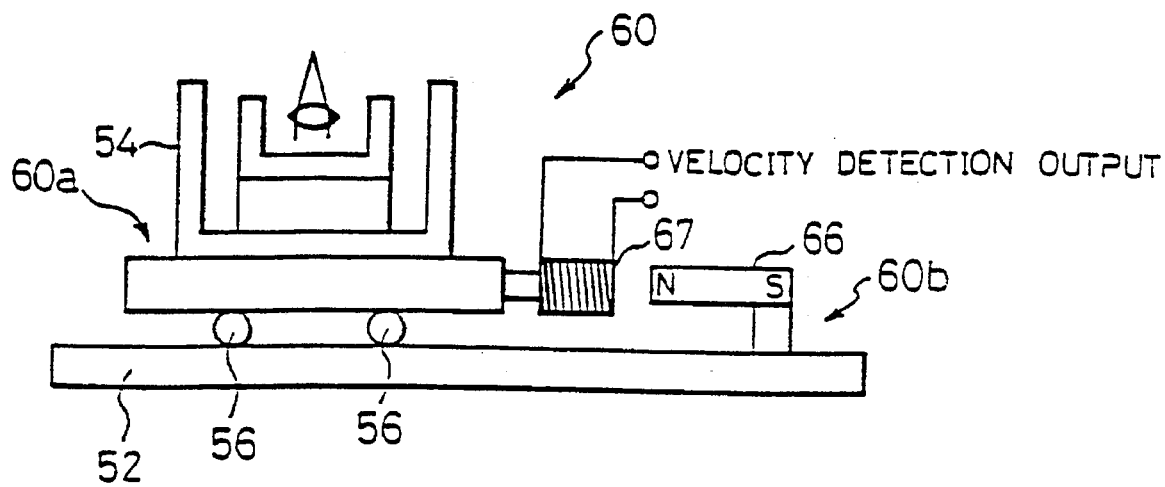
FIG. 33 is a view showing the structure in which a velocity sensor is provided in the motor control device.
Figure 34:
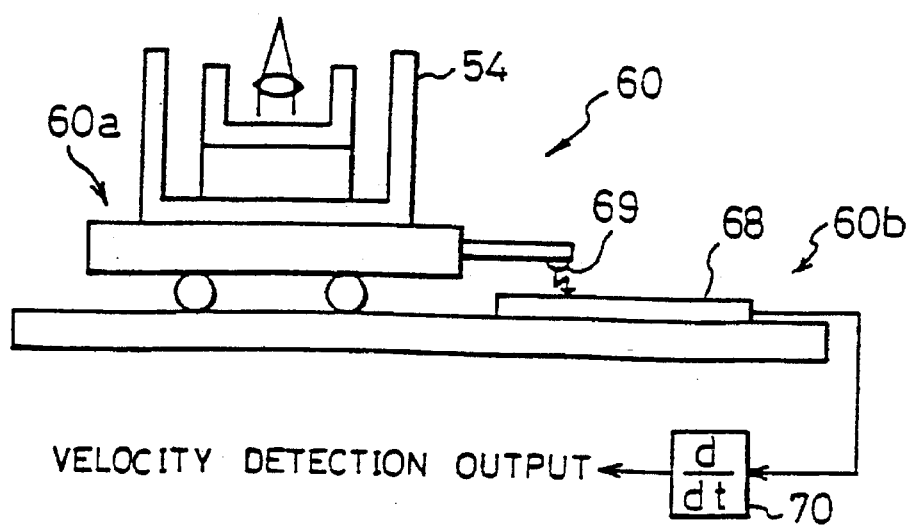
FIG. 34 is a view showing the structure in which another velocity sensor is provided in the motor control device.
Figure 35:
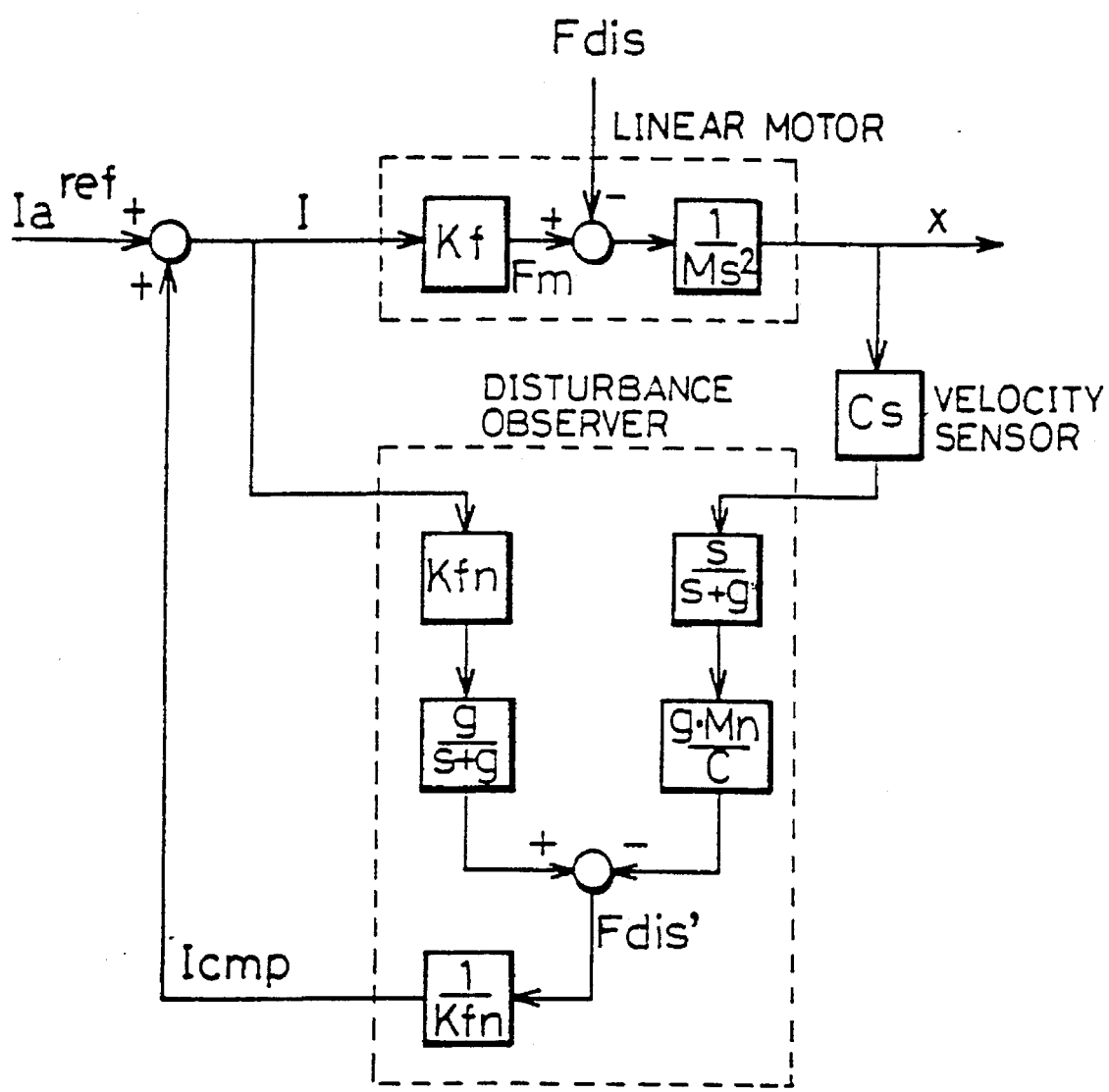
FIG. 35 is a block diagram showing a control mechanism in the motor control device.

The acceleration sensor 16a converts the mechanical distortion, which occurs in the piezoelectric element 21 due to an applied acceleration, to an electric signal. According to the acceleration sensor 16a, it is not necessary to combine the devices and elements provided in both the motor movable section and the motor stationary section unlike the velocity sensor shown in FIGS. 33 and 34. Namely, the acceleration sensor 16a itself can independently function as a sensor.

Therefore, according to the acceleration sensor 16a, it is not necessary to consider the positioning accuracy of the devices and elements provided in both the motor movable section and the motor stationary section. Moreover, the flexibility of designing of the mechanical system is increased and the device becomes compact and lightweight. Accordingly, it is possible to reduce the danger of unnecessary resonance modes of the motor movable section 10a due to installing the above-described acceleration sensor 16a.

As already described, the disturbance observer 17 using the acceleration sensor 16a in accordance with the present invention has an advantage in the noise aspects compared with the case using a velocity sensor. The following discusses about the reason, using mainly FIGS. 11 and 12.

Figure 11:
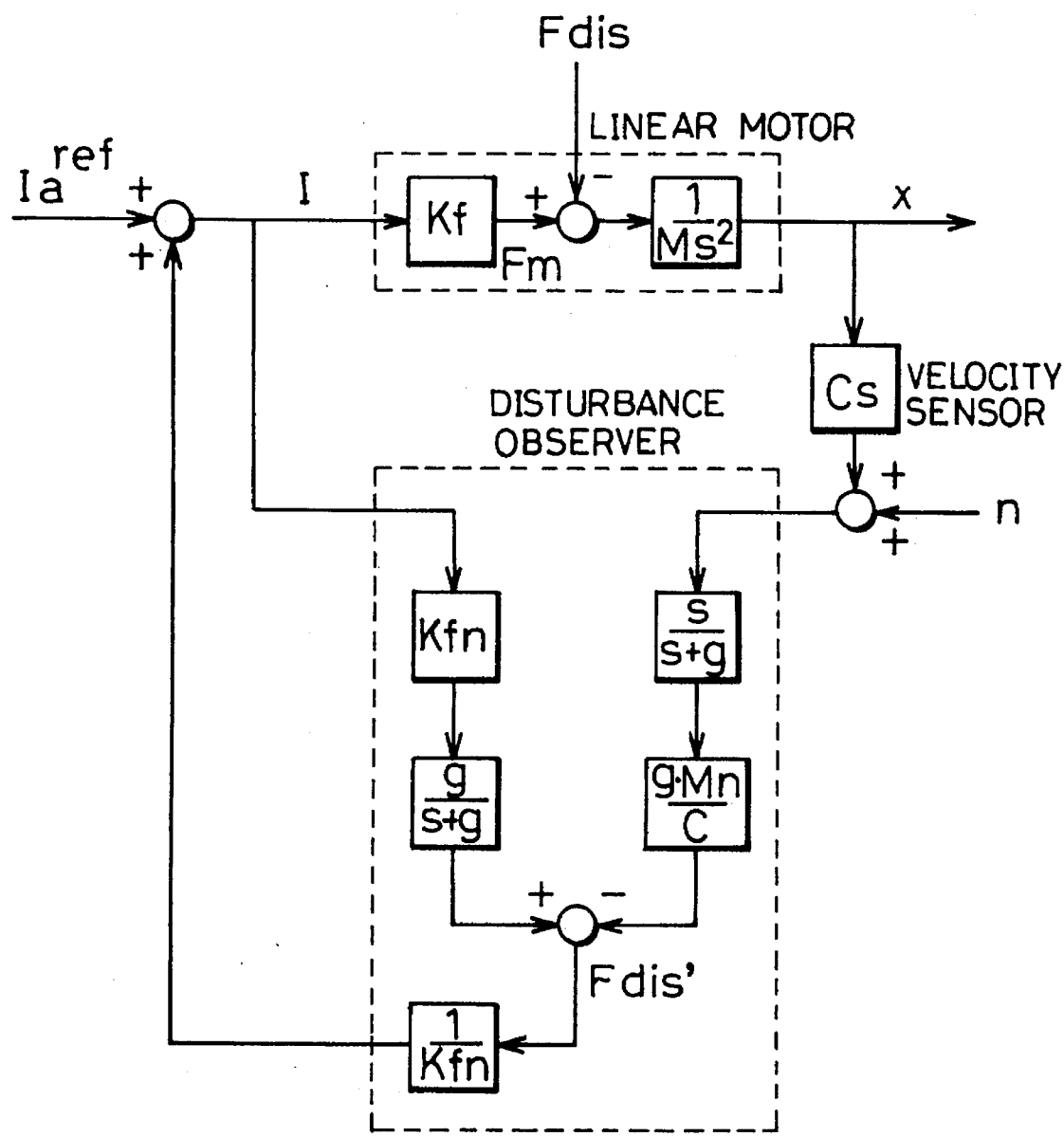
FIG. 11 is a block diagram showing a disturbance observer using a velocity sensor having noise "n" for comparison.

First, FIG. 11 shows a block diagram of the case where the affections of the noises due to the velocity sensor are applied to a motor control device which has the disturbance observer using the velocity sensor. Here, the velocity sensor is regarded as a first-order differentiator having sensitivity of C. There is provided after the velocity sensor an approximate differentiator which covers up to the bandwidth g. The approximate differentiator converts the velocity to an acceleration.

In FIG. 11, assuming that the reference driving current $I_a^{ref}$ applied from outside and the disturbance force $F_{dis}$ are 0 respectively, the transfer characteristic from n to x in the bands lower than g (s<g) is calculated as follows, taking the relations $[g/(s+g)] \approx 1$, $[s/(s+g)] \approx (s/g)$ into consideration. Namely, the equation (10) is obtained from the relation (9).

$$\begin{aligned} I = \ & K_{fn} \cdot (1/K_{fn}) \cdot I - \\ & (s/g) \cdot (g \cdot M_n/C) \cdot (1/K_{fn}) \cdot C \cdot s \cdot x + \\ & (s/g) \cdot (g \cdot M_n/C) \cdot (1/K_{fn}) \cdot n \end{aligned} \quad (9)$$

$$x = [1/(C \cdot s)] \cdot n \quad (10)$$

The driving current I is calculated like the following equation (12), using both the next equation (11), which is obtained by substituting 0 into the disturbance force $F_{dis}$ in the equation (4), and the equation (10).

$$x = [K_f/(M \cdot s^2)] \cdot I \quad (11)$$

$$\therefore I = [M \cdot s/(K_f \cdot C)] \cdot n \quad (12)$$

Since the Laplace operator indicates an angular frequency in the equation (12), the driving current I is increased due to the noise n in proportion to the frequency. Accordingly, the wasteful power consumption, heating, vibrations, noises, and so on occur in the driver or the linear motor.

Figure 12:
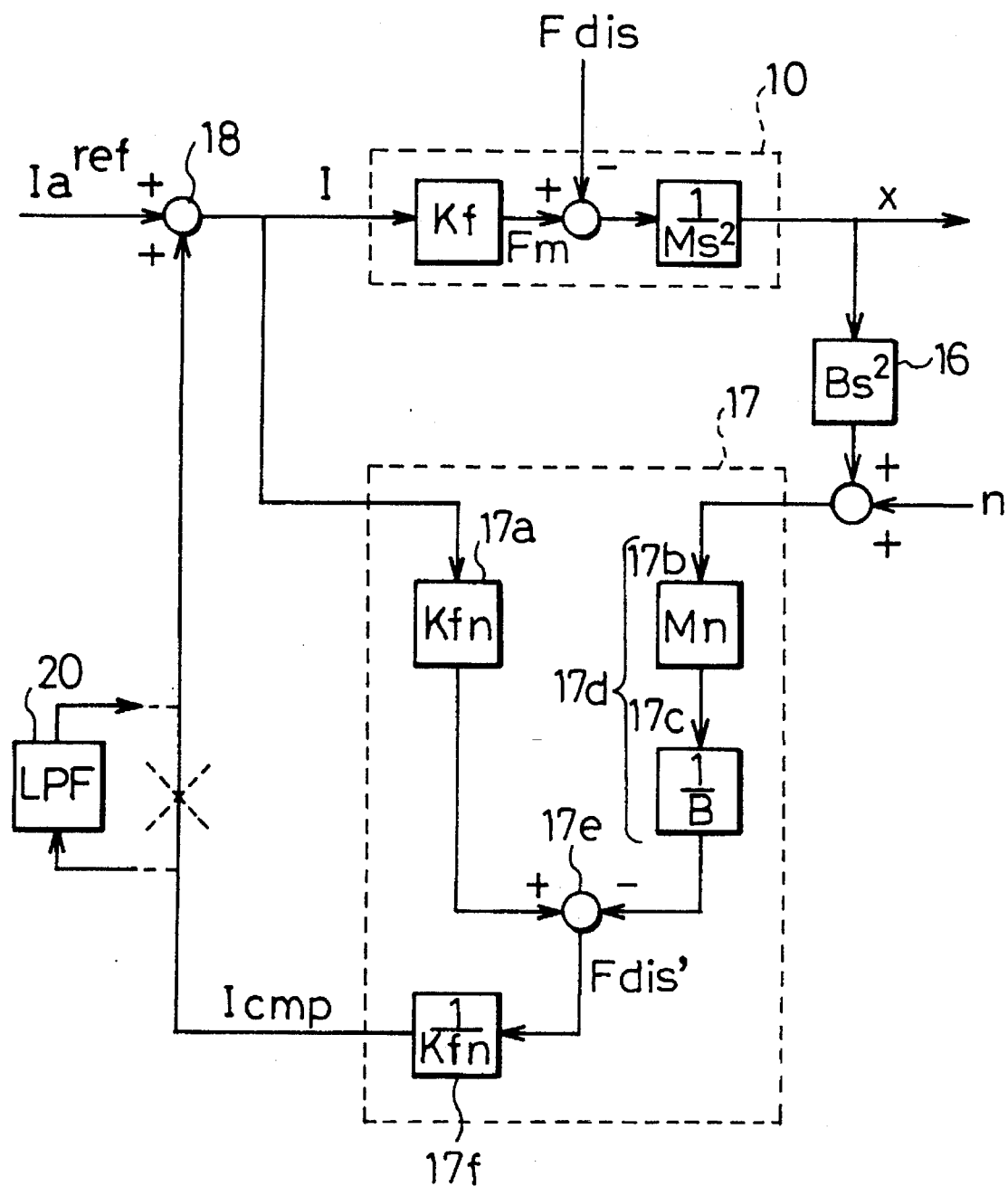
FIG. 12 is a block diagram showing a case where an acceleration sensor unit has noise "n" in the above-described motor control device.

Meanwhile, FIG. 12 is a block diagram showing the case where the noise n of the acceleraion sensor unit 16 is applied with respect to the block diagram of FIG. 3. The transfer characteristic from n to x is similarly calculated as follows. Namely, the relation (14) is obtained from the equation (13).

$$\begin{aligned} I = \ & K_{fn} \cdot (1/K_{fn}) \cdot I - \\ & (M_n/B) \cdot (1/K_{fn}) \cdot B \cdot s^2 \cdot x + \\ & (M_n/B) \cdot (1/K_{fn}) \cdot n \end{aligned} \quad (13)$$

$$x = [1/(B \cdot s^2)] \cdot n \quad (14)$$

The driving current I is calculated as the following equation (15), according to the relation (11) and the relation (14).

$$\therefore I = [M/(K_f \cdot B)] \cdot n \quad (15)$$

The equation (15) does not include a term concerning the angular frequency. Therefore, it is clear that the affections due to the high frequency components of the noise n of the disturbance observer in accordance with the present invention is much smaller than that of the disturbance observer using a velocity sensor.

Moreover, the disturbance observer using the velocity sensor as shown in FIG. 11 needs the block having the amplitude of $(g \cdot M_n/C)$ multiplied by the upper limit value g, as a gain term, of the frequency bandwidth in which the differentiation is carried out.

As already described, the amplification degree of this block needs to be greater as the above-described g becomes greater, and such configuration is difficult to be realized. However, the disturbance observer 17 using the acceleration sensor 16a does not need the block having a great amplification degree multiplied by g, i.e., an electronic circuit having great amplification degree, so that such configuration is easily realized.

Additionally, the disturbance observer 17 using the acceleration sensor 16a in accordance with the present invention is insensible to the noise n of the acceleration sensor unit 16 and the circuits and is hard to be affected from the noise n. However, if it is necessary to lower the affection of the noise n, it is possible to provide the LPF 20 between the third block 17f and the adder 18 (see the bloken line of FIGS. 3 and 12) so as to limit the band.

[SECOND EMBODIMENT]

Refering to FIGS. 13 through 16, the following description will discuss the second embodiment of the present invention. Here, for convenience, those members that have the same functions described in the foregoing first embodiment are indicated by the same reference numerals and the description thereof is omitted.

Figure 13:
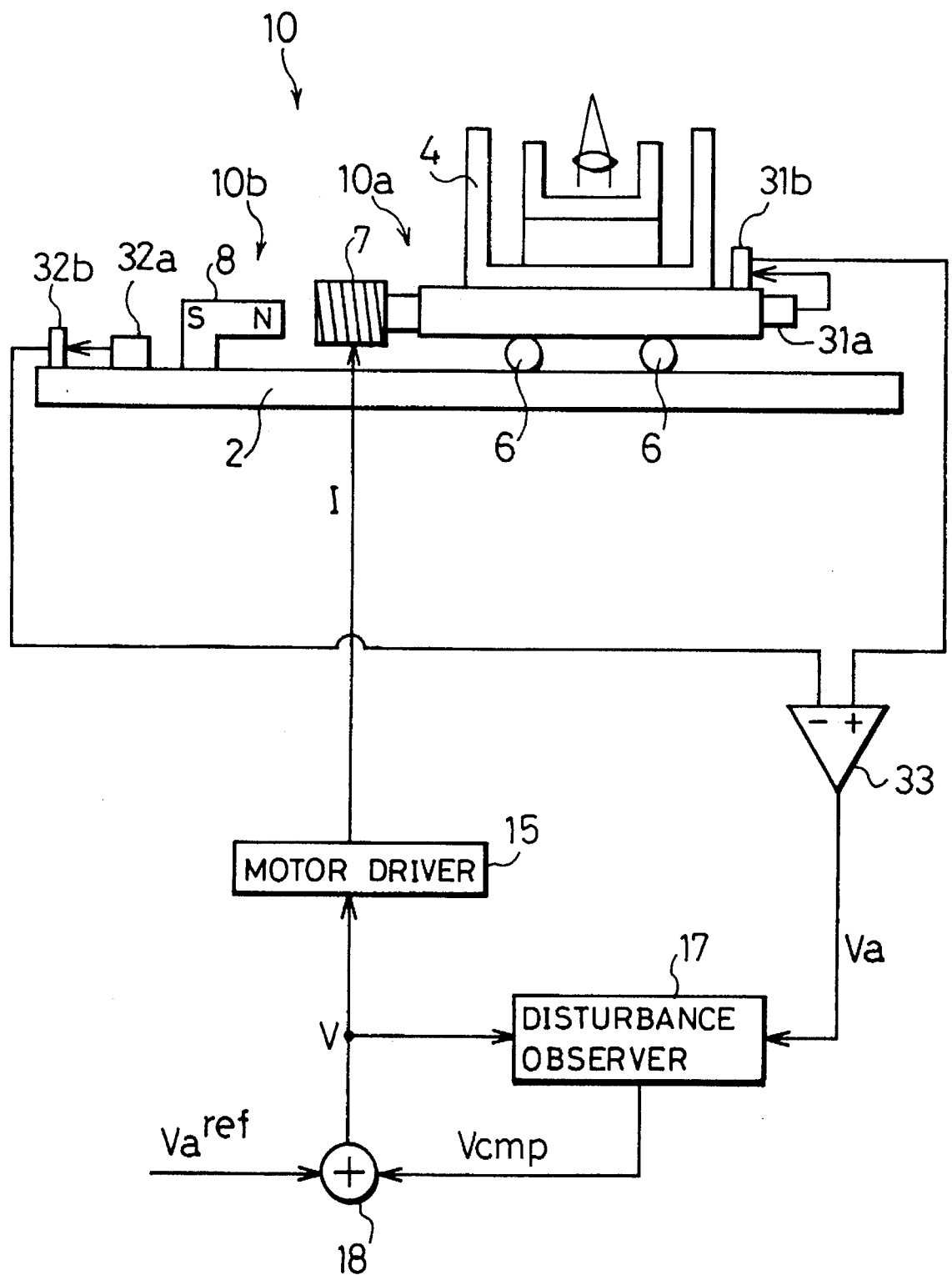
FIG. 13 is a view showing the structure of the second embodiment of a motor control device for an information recording and reproducing apparatus of the present invention.
Figure 14:
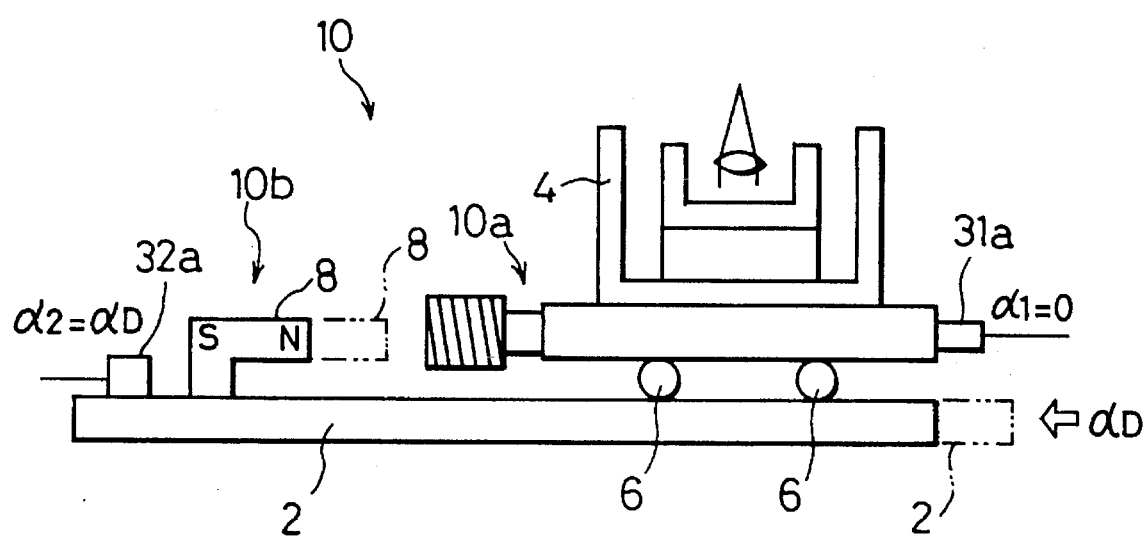
FIG. 14 is an explanatory view showing a case where vibrations and shocks are applied to the motor control device.
Figure 15:
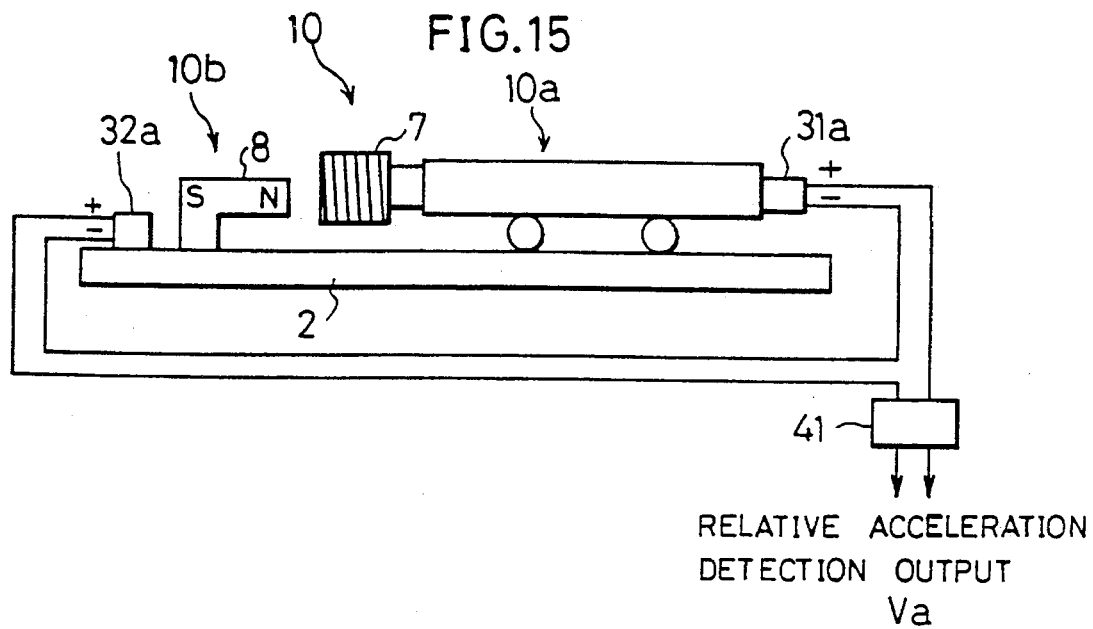
FIG. 15 is an explanatory view showing another connecting example of each acceleration sensor unit of the motor control device.

In the motor control device for the information recording and reproducing apparatus, as shown in FIG. 13, first and second acceleration sensors 31a and 32a are substituted for the acceleration sensor 16a in the first embodiment, which have the same functions as that of the acceleration sensor 16a.

Similarly to the first embodiment, the first acceleration sensor 31a and the second acceleration sensor 32a are provided with a first buffer amplifier 31b and a second buffer amplifier 32b respectively. The first and second buffer amplifier 31b and 32b are configured by the circuit shown in FIG. 2 for example.

The first acceleration sensor 31a and the first buffer amplifier 31b are provided on the motor movable section 10a of the linear motor 10, while the second acceleration sensor 32a and the second buffer amplifier 32b are provided on the chassis 2 on which the motor stationary section 10b is mounted.

There is provided a subtracter 33, to which (1) the output of the first buffer amplifier 31b of the first acceleration sensor 31a and (2) the output of the second buffer amplifier 32b of the second acceleration sensor 32a are inputted, for calculating and outputting the difference of the two above-described outputs. The output of the subtracter 33 is inputted to the disturbance observer 17 as an acceleration signal $V_a$.

Therefore, the first acceleration sensor 31a and the second acceleration sensor 32a are installed so that the output of the first buffer amplifier 31b and the output of the second buffer amplifier 32b are canceled with each other by the subtracter 33 when the accelerations having the same direction are respectively applied to both the motor movable section 10a and the chassis 2 which has the motor stationary section 10b.

Alternatively, the first acceleration sensor 31a and the second acceleration sensor 32a are connected so that the polarities of the output of the first buffer amplifier 31b and the output of the second buffer amplifier 32b are canceled with each other by the subtracter 33 when the accelerations are respectively having the same direction added to the motor movable section 10a and the chassis 2 which has the motor stationary section 10b.

By the way, in the apparatuses using various motors, the absolute control for the motor movement is not required. Namely, the relative control is required with respect to a part in the apparatus.

Namely, the track 1a on the optical disk 1 which is rotated by the spindle motor 3 (see FIG. 1) displaces with respect to the chassis 2. Therefore, in order to make the laser beam 4a follow up the track 1a accurately, it is necessary to arrange the linear motor 10 so that the linear motor 10 controls the optical pickup 4, which is installed on the motor movable section 10a, so as to move relative to the chassis 2, which fixes the motor stationary section 10b, in accordance with the relative acceleration.

According to the arrangement of the second embodiment, the difference of the acceleration due to the motor movable section 10a and that due to the chassis 2 which fixes the motor stationary section 10b is detected. Therefore, even in the case where the reaction of the motor stationary section 10b due to the movement of the motor movable section 10a cannot be ignored, since the relative acceleration, including accelerations due to the reaction, of the motor movable section 10a with respect to the motor stationary section 10b is detected, it is possible to make the laser beam 4a follow up the track 1a accurately, thereby ensuring more accurate control of the linear motor 10.

Moreover, when the vibrations or shocks having an acceleration $\alpha_D$ to the chassis 2 from outside, if the bearings 6 of the linear motor 10 slides very smooth, it is likeky to occur that the acceleration $\alpha_1$, detected by the motor movable section 10a, is 0 and the acceleration $\alpha_2$, detected by the motor stationary section 10b, is equal to $\alpha_D$.

Namely, according to the first embodiment where only the motor movable section 10a has the acceleration sensor 16a, the disturbance observer 17 occasionally fails to cancel the above-described vibrations and the shocks because the acceleration detected by the acceleration sensor 16a is 0.

In contrast, according to the arrangement of the second embodiment, the first and second acceleration sensor 31a and 32a are installed with respect to the motor movable section 10a and the motor stationary section 10b respectively, so the relative acceleration $(\alpha_1-\alpha_2=-\alpha_D)$ can be detected.

Therefore, with the above-described arrangement, the disturbance observer 17 can control and drive the motor movable section 10a so that the relative acceleration becomes 0 upon receipt of the above-described movements of vibrations, shocks, or so which are independent from the externally applied reference driving voltage $V_a^{ref}$ (or $I_a^{ref}$), thereby resulting in that the foregoing bad affections such as vibrations and shocks are suppressed.

In the arrangement shown in FIG. 13, in order to detect the relative acceleration, the subtracter 33 calculates the difference between the output of the first buffer amplifier 31b of the first acceleration sensor 31a and the output of the second buffer amplifier 32b of the second acceleration sensor 32a. However, such a configuration can be substituted for the configuration of FIG. 15, without the subtracter 33, in which a buffer amplifier 41 is provided, and the output of the first acceleration sensor 31a and the output of the second acceleration sensor 32a are connected in reverse series with respect to the buffer amplifier 41 so that the two outputs are subtracted with each other.

Figure 16:
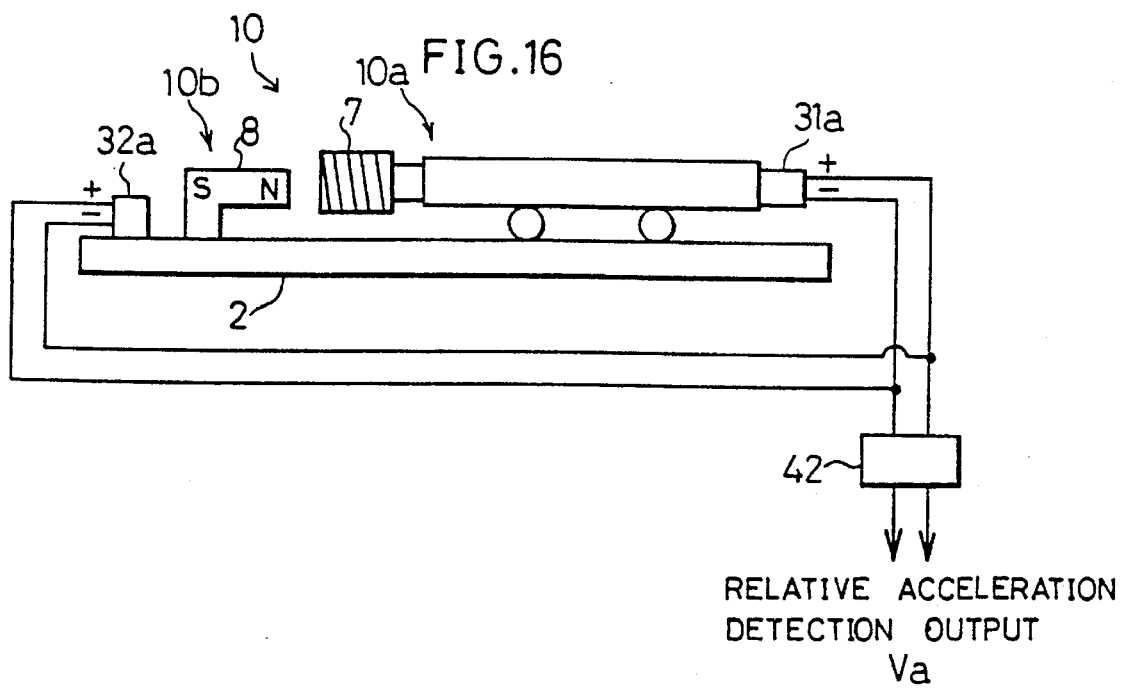
FIG. 16 is an explanatory view showing a still another connecting example of each acceleration sensor unit of the motor control device.

Alternatively, the configuration of FIG. 16, without the subtracter 33, may be possible in which a buffer amplifier 42 is provided, and the output of the first acceleration sensor 31a and the output of the second acceleration sensor 32a are connected in reverse parallel with respect to the buffer amplifier 42 so that the two outputs are subtracted with each other. Here, the circuits equivalent to the buffer amplifier 16b as shown in FIG. 2 may be used as the above-described buffer amplifier 41 and the buffer amplifier 42.

Note that the signs "+" and "−" given to the first acceleration sensor 31a and the second acceleration sensor 32a indicate the polarities of the voltage or the current which is generated when the accelerations having the same direction are added to the sensor 31a and the sensor 32a.

[THIRD EMBODIMENT]

Figure 17:
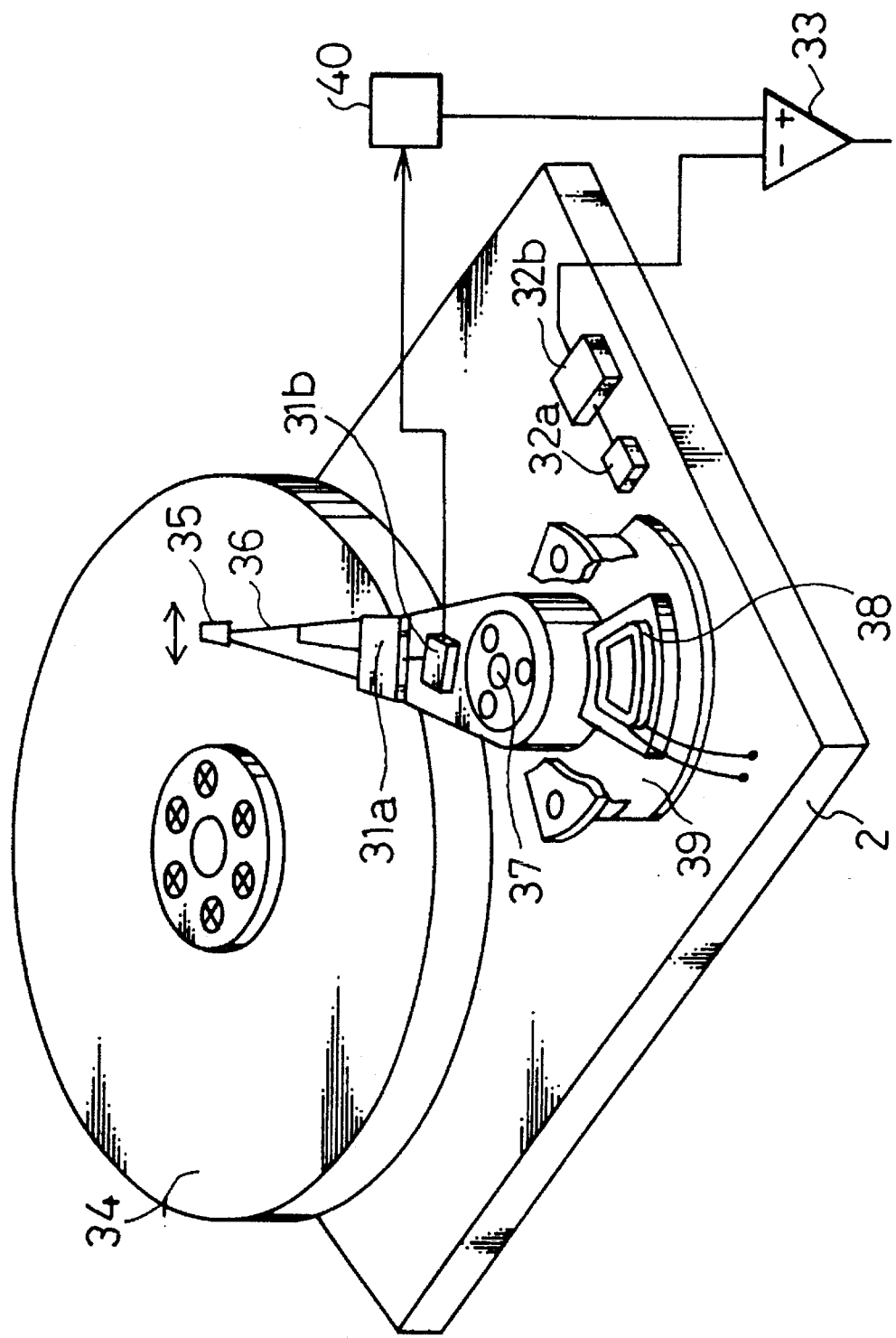
FIG. 17 is a view showing the structure of the third embodiment of a motor control device for an information recording and reproducing apparatus of the present invention.
Figure 18:
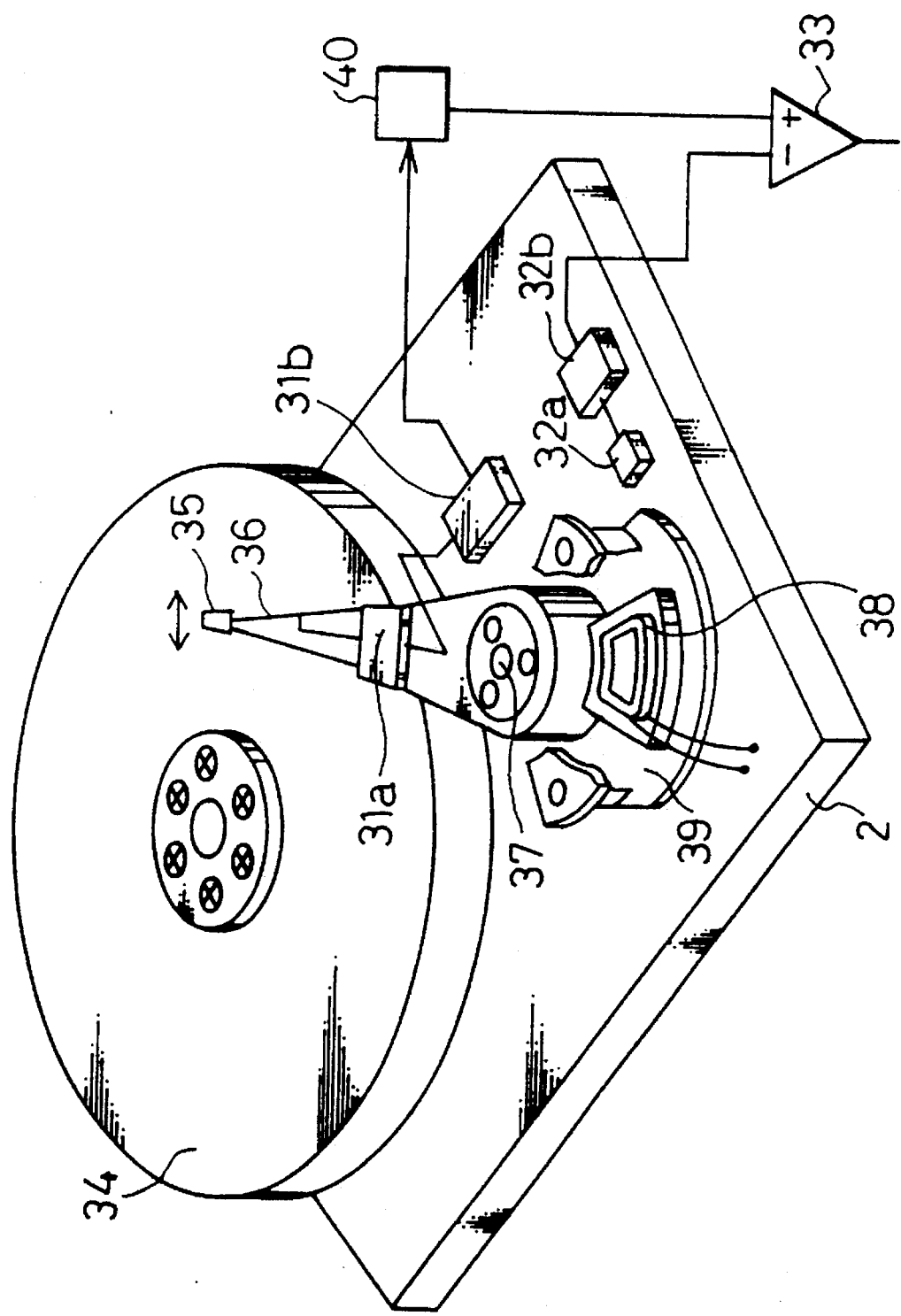
FIG. 18 is a view showing the modified structure of the third embodiment of a motor control device for information recording and reproducing apparatus of the present invention.

Refering to FIGS. 17 and 18, the following description will discuss the third embodiment of the present invention. Here, for convenience, those members that have the same functions described in the aforementioned embodiments are indicated by the same reference numerals and the description thereof is omitted.

According to the arrangement of the third embodiment, the motor control device of the second embodiment in the present invention is adapted to a swing motor in a magnetic disk apparatus as an informatioin recording and reproducing apparatus. As shown in FIG. 17, the positioning in the radial direction on the magnetic disk (disk-type recording medium) 34 which is driven so as to be rotated by a spindle motor (not shown) is made by rotating a head 35 around a rotating axis 37 with a swing arm 36.

A mechanism referred to as a swing motor drives the swing arm 36. The swing motor uses the electro-magnetic force generated between a driving coil 38 installed on the swing arm 36 and a permanent magnet 39 installed on the chassis 2 by applying a current to the driving coil 38.

The swing arm 36, which is a movable section of the swing motor, is provided with the first acceleration sensor 31a, and the chassis 2, which is a stationary section, is provided with the second acceleration sensor 32a. The outputs of the respective acceleration sensors 31a and 32a are buffered by the respective buffer amplifiers 31b and 32b similar to the second embodiment, and inputted to the disturbance observer 17 after the subtracter 33 calculates the difference between the outputs.

Note that at least one of the output of the buffer amplifier 31b of the acceleration 31a and the output of the buffer amplifier 32b of the acceleration 32a is sent to the subtracter 33 through a gain controller 40. The gain controller 40 is composed of amplifiers, attenuators and other circuits. Therefore, the accurate relative acceleration is obtained as described later.

Though the swing motor is a rotary motor, the motor can be regarded as the motor which functions in the same way as that of a substantially direct acting type linear motor in the range of the rotation angle in the case where the rotation angle is limited like the magnetic disk apparatus. Therefore, it is possible to apply the disturbance observer 17, which uses the above-described acceleration sensors 16a, 31a, and 32a, to the arrangement of the third embodiment.

However, in the rotary motor, the relative acceleration of the swing arm 36 with respect to the chassis 2 due to the reaction of the swing arm 36 with respect to the chassis 2, vibrations and shocks applied from outside is sometimes different according to the degree of the inbalance of the swing arm 36, which is a motor movable section, with respect to the rotating axis 37.

The gain controller 40 is provided in the third embodiment in order to meet such a case and therefore it can calculate accurate relative accelerations. Moreover, since the gain controller 40 is provided, the first acceleration sensor 31*a* and the second acceleration sensor 32*a* need not be of the same rating.

Therefore, it is possible to make the first acceleration sensor 31*a* installed to the swing arm 36 small, thereby enabling to reduce the inertial mass of the swing arm 36 and make the movement of the swing arm 36 smoother.

Moreover, the first buffer amplifier 31*b* of the first acceleration sensor 31*a* need not always be installed on the swing arm 36 as shown in FIG. 17, but may be installed on the chassis 2 which is the stationary section as shown in FIG. 18. In such a case, the inertial mass of the swing arm 36 can be further reduced.

[FOURTH EMBODIMENT]

Refering to FIGS. 1, 3, 19 through 24, the following description will discuss the fourth embodiment of the present invention. Here, for convenience, those members that have the same functions described in the aforementioned embodiments are indicated by the same reference numerals and the description thereof is omitted.

In the motor control device of the fourth embodiment in the present invention, in the case where the disturbance observer 17 and the acceleration sensor 16*a* are used in combination during controlling of the motor mechanism such as the linear motor 10 of the optical disk apparatus, the disturbance observer 17 is prevented from driving the motor device too sensitively and too greatly by the low frequency band cutoff characteristic due to the acceleration sensor system including the acceleration sensor 16*a*. Therefore, it is avoidable that the motor mechanism itself and the optical pickup or the head which are moved by the motor mechanism are damaged.

First, the disturbance observer 17 can fix the parameters (the characteristic) of the motor mechanism to the nominal values and can suppress the affections of the disturbances, as described in the first to third embodiments.

Moreover, the first to third embodiments disclose that there are more merits in the combination with the acceleration sensors 16*a*, 31*a*, and 32*a* using the piezoelectric element, when the disturbance observer 17 is applied to the linear motor 10 and the swing arm 36 which is a rotary motor of the magnetic disk apparatus having a limited rotation range, than in the combination with the velocity sensor in the controlling of the conventional rotary motor. Among the merits, the following points are specially important:

(a) Since the differentiator can be omitted, there is little affection of the noises in the high frequency bandwidth, and it is easy to expand the controlling frequency bandwidth on the higher band side. In such expansion, an amplifier having a high gain which is required for the differentiator is not required, and the circuit is easy to be realized.

(b) Since the sensor is lightweight and not bulky, there is little limitation on the installation. Moreover, the peripheral size of the motor can be reduced.

By the way, the disturbance observer 17 combined with the acceleration sensor 16*a* or so is suitable for the controlling of the linear motor or so as above-described, and the controlling frequency bandwidth is easy to be expanded to higher frequency band. However, on the contrary, in order to expand the controlling frequency bandwidth on the lower frequency side, an attention should be paid to the low frequency band cutoff characteristic which is difficult to avoid when the acceleration sensor 16*a* or so is in use.

Ordinarily, the acceleration sensor 16*a* or so detects the acceleration by making use of an electric charge Q which is generated by a piece of a piezoelectric element when an acceleration (or a force caused by the acceleration) is applied to the piezoelectric element and accordingly mechanical distortion is generated. The electric charge varies depending on the capacitance C of the piezoelectric element itself, i.e., varies depending on the equation V(=Q/C), V indicative of voltage.

Figure 19:
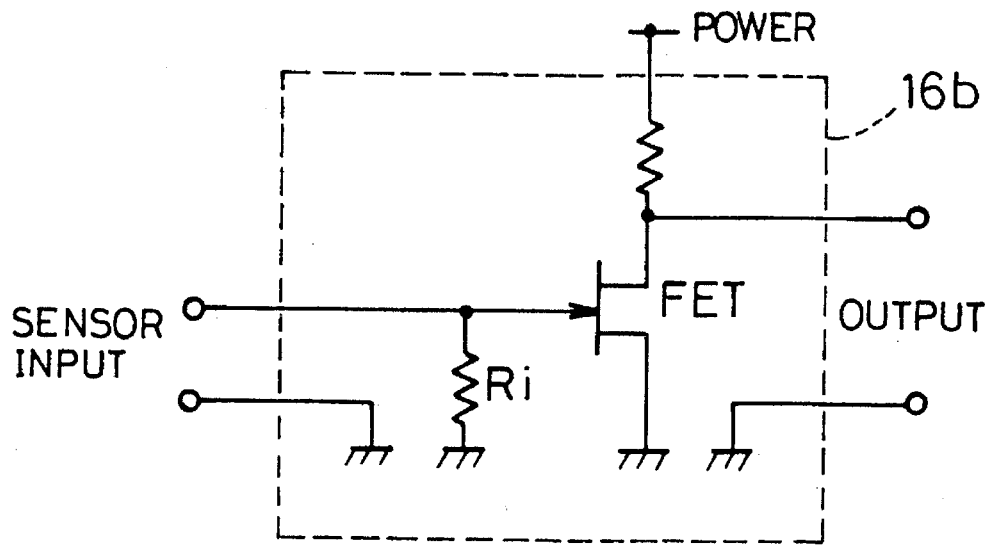
FIG. 19 is a view showing the structure of a buffer amplifier used for the acceleration sensor.

The acceleration sensor 16*a* using the piezoelectric element 21 has extremely high impedance, so it is difficult to send such a voltage signal through the long wiring as it is. Therefore, ordinarily, as respectively shown in FIGS. 19 and 20, a buffer amplifier 16*b* using an FET or an OP amplifier A is provided near the sensor so as to obtain the low impedance output. The registor $R_i$ shown in FIGS. 19 and 20 is provided for the path of the bias voltage and current of the FET or the OP amplifier A.

Figure 21:
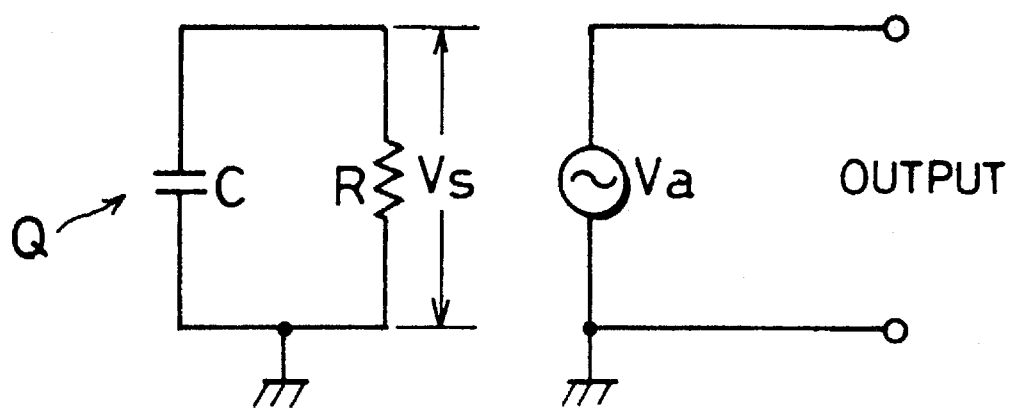
FIG. 21 is a view showing an equivalent schematic when the acceleration sensor and the buffer amplifier are combined.

FIG. 21 shows an equivalent schematic of the acceleration sensor 16*a* when the buffer amplifier 16*b* is provided in the foregoing manner. C indicates the capacitance of the piezoelectric element. R indicates the combined resistance, in parallel, of (1) a leakage (insulation) resistance of the piezoelectric element itself which is a sensor and (2) an input resistance of the buffer amplifier using the FET or the OP amplifier. Since the leakage resistance of the piezoelectric element 21 itself has a resistance having an extremely high order of $10^9\Omega$–$10^{12}\Omega$ and the input resistance of the FET or the OP amplifier of the buffer amplifier 16*b* has also a resistance having an extremely high order of $10^9\Omega$–$10^{12}\Omega$, R is likely to be substantially equal to the resistance $R_i$ provided in the input of the buffer amplifier 16*b*.

Q indicates the electric charge which is generated by the piezoelectric element in accordance with the acceleration and is generated across the capacitor C of the piezoelectric element. $V_s$ is the voltage across the capacitor C of the equivalent schematic of FIG. 21. A voltage source $V_a$ on the output side indicates the voltage outputted from the buffer amplifier 16*b* in which the impedance of the voltage $V_s$ is converted.

Figure 20:
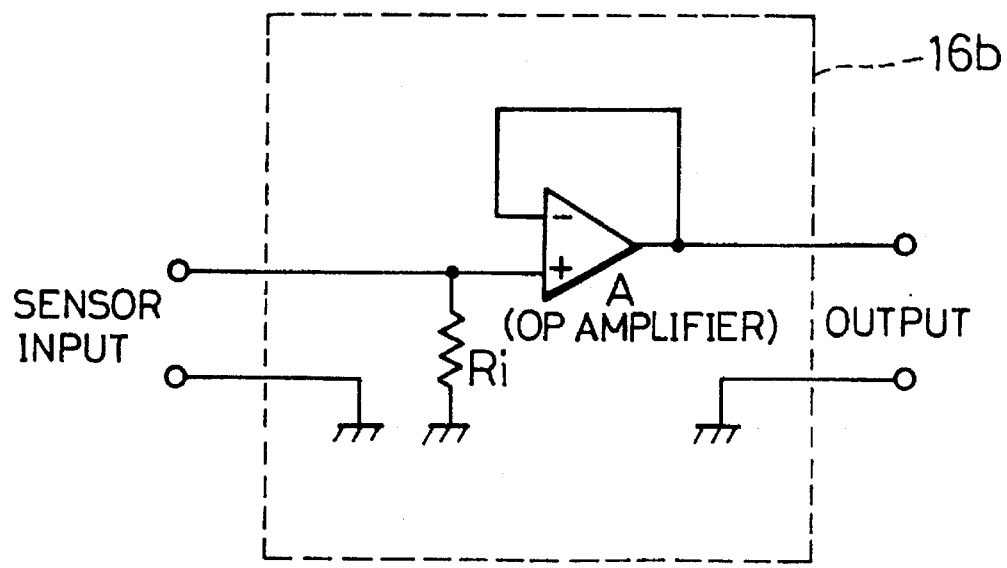
FIG. 20 is a view showing the structure of another buffer amplifier used for the acceleration sensor.

Here, in the case where the buffer amplifier 16*b* is the voltage follower composed of the OP amplifier as shown in FIG. 20, $V_a$ is equal to $V_s$ and their polarities are the same because the amplification degree of the buffer amplifier 16*b* is equal to 1. In contrast, in the case where the buffer amplifier 16*b* is the grounded source amplifier of FET as shown in FIG. 19, this $V_a$ is ordinarily not equal to $V_s$ and their polarities are opposite with each other because the amplification degree of the buffer amplifier 16*b* is ordinarily not equal to 1.

Now, in order to study the frequency characteristic of the equivalent schematic of FIG. 21, it is assumed that a step acceleration α is applied to the acceleration sensor 16*a* and an electric charge Q is generated across the piezoelectric element. The voltage $V_s$ across C and R varies depending on time t by the equation (9) with starting from the initial voltage $V_0(=Q_0/C)$.

$$V_s = V_0 \cdot exp(-t/RC) \qquad (9)$$

This indicates the primary incomplete differentiating characteristic. When the transfer characteristic from the acceleration α to the voltage $V_s$ is expressed by the transfer function which is obtained by the Laplace transformation, the equation (10) is satisfied.

$$(V_s/\alpha) = s/(s+\omega_p) \qquad (10)$$

Note that $\omega_p$ is equal to $1/(RC)$. The equation (10) indicates the low frequency band cutoff characteristic which cuts off the frequency components of lower than $\omega_p$, or indicates the high pass filter characteristic.

In other words, the acceleration sensor 16a using the piezoelectric element 21 cannot detect the acceleration components of frequencies lower than the low frequency band cutoff angular frequency $\omega_p$ (or the low frequency band cutoff frequency obtained by dividing this by $2\pi$). Here, the low frequency band cutoff angular frequency is obtained from both the capacitance of the piezoelectric element C and the resistance R which is determined by the input resistance or so of the buffer amplifier 16b.

By the way, FIG. 3, which is the block diagram of the disturbance observer 17, shows that the block (amplifier) 17a having a gain of the nominal value $K_{fn}$ of the driving force constant is directly connected to the comparator 17e. Moreover, the acceleration sensor unit 16 which detects accelerations is composed of the acceleration sensor 16a of the piezoelectric element (see FIG. 1) and the buffer amplifier 16b.

Figure 22:
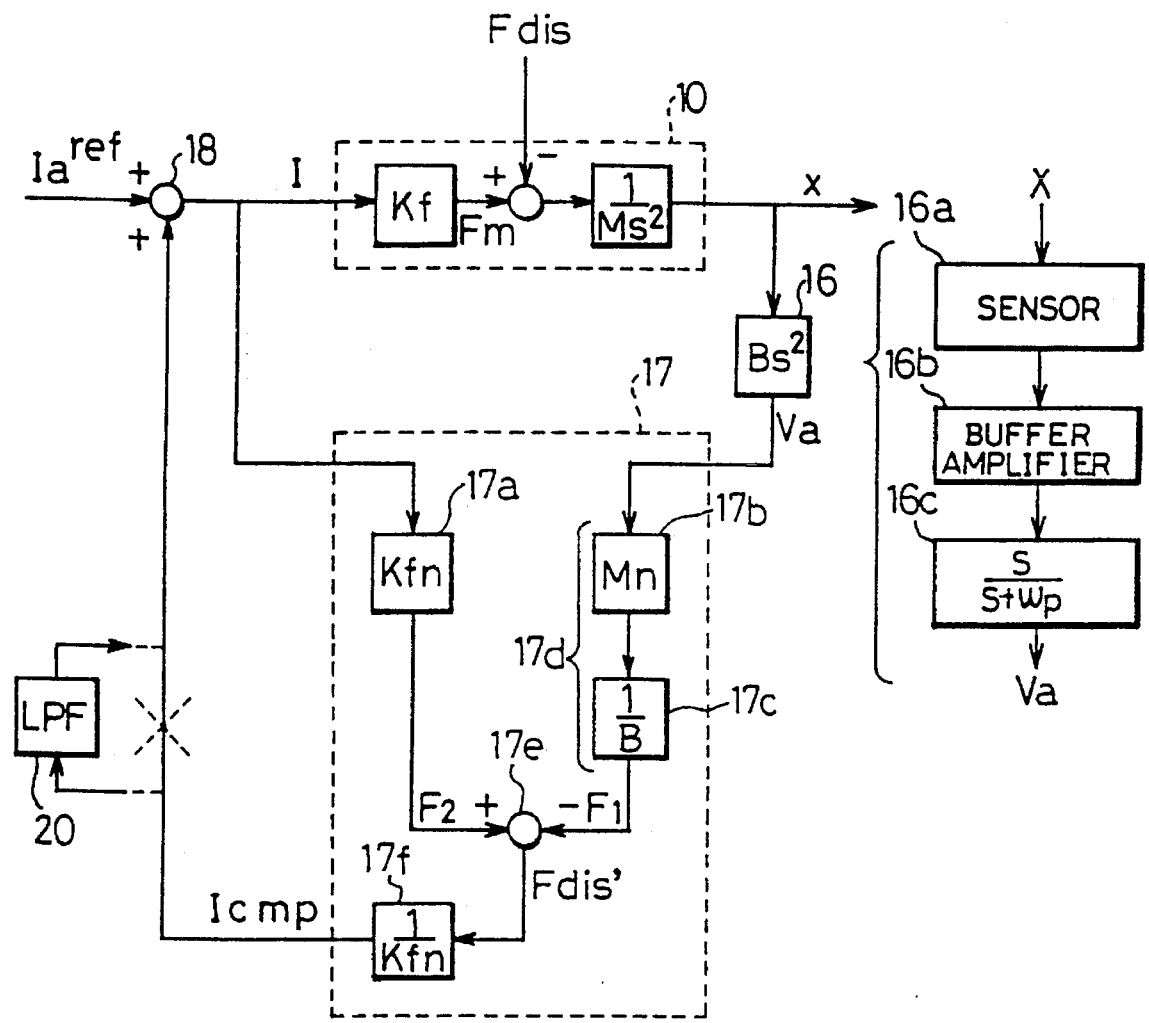
FIG. 22 is a block diagram showing a rewritten diagram for the block part shown in FIG. 3.

Therefore, as shown in FIG. 22, there actually exists, on the path (the second path) which is formed by connecting the acceleration sensor unit 16 to the comparator 17e through the blocks (amplifier) 17b and 17c, a block 16c having the low band cutoff characteristic or the high pass filter characteristic which is inevitable and not separable and which is caused by both the acceleration sensor 16a and the buffer amplifier 16b.

Here, it is assumed that a frequency component of lower than the low frequency band cutoff angular frequency $\omega_p$, a direct current, for example, is applied as the reference driving current $I_a^{ref}$ from outside In order to simplify the explanation, it is assumed that the compensating current $I_{cmp}$ is equal to 0 as the initial condition. Then, the actual driving current I of the linear motor is equal to $I_a^{ref}$ and $F_2 = K_{fn} \cdot I$ is outputted from the first block 17a.

However, the acceleration sensor unit 16 cannot detect the direct current component of the movement of the linear motor 10 due to the direct current component of the driving current I. Accordingly, the output $F_1$ of the second block 17d is 0. Therefore, the $F_{dis}' = F_2 - F_1 \neq 0$ is outputted from the comparator 17e, and the compensating current $I_{cmp}$ of the direct current is generated. The $I_{cmp}$ is added to $I_a^{ref}$ by the adder 18 so as to output as the driving current I again to the linear motor 10 and the disturbance observer 17 respectively.

However, the driving current I intensified by the compensating current $I_{cmp}$ is still a direct current component. Though the output $F_2$ of the first block 17a is increased according to this driving current I, the acceleration sensor unit 16 still fails to detect the direct current component of the movement of the linear motor 10, and so the output $F_1$ of the second block 17d is still 0. Accordingly, the output $F_{dis}'(= F_2 - F_1)$ of the comparator 17e is further increased and the compensating current $I_{cmp}$ which is fed back is also increased.

After repeating such procedure, the voltage or current applied to the path which connects the first block 17a, the third block 17f of the disturbance observer 17 and the adder 18 is saturated, for example, to a full amplitude of the maximum voltage and current of the electronic circuit such as an OP amplifier forming the path. Since the current corresponding to the maximum saturated amplitude continues to be applied to the linear motor 10, the linear motor 10 is occasionally driven to the limit of the mechanically movable range and finally collides with the end of the driving range.

Such a phenomenon is reasonable by understanding that the operation principle of the disturbance observer 17 is that the disturbance observer 17 drives the linear motor 10 in response to the compensating current $I_{cmp}$ so that $F_2$ calculated from the driving current I and $F_1$ calculated from the output of the acceleration sensor unit 16 may be equal to each other. In this case, the disturbance observer 17 continues to drive the linear motor 10 until the acceleration sensor unit 16 sends the corresponding acceleration signal of the direct current component, and finally makes the linear motor 10 have the foregoing collision.

Even if the reference value $I_a^{ref}$ of the driving current is not made of direct current components but made of alternating current components, a similar phenomenon occurs if its frequency is lower than the low frequency band cutoff frequency of the acceleration sensor unit 16. In such a case, it is possible that the linear motor 10 can avoid the foregoing collision when the polarity of the $I_a^{ref}$ becomes reversed before the above-described path of the disturbance observer 17 is saturated. However, since the acceleration sensor unit 16 can not fully detect the movement of the linear motor 10, the disturbance observer 17 drives the linear motor 10 with excessive amplitudes until the enough acceleration signals of the frequency components are sent.

The foregoing explanation deals with the case of the problems due to the reference driving current $I_a^{ref}$. However, a similar problem occurs even in the case where the vibrations or shocks are introduced as the disturbance force $F_{dis}$ and in the case where the noises, due to the circuits or due to the acceleration sensor unit 16, exist.

Whatever the reason is, it is the only necessary thing that the output $F_1$ or $F_2$ has the signals having frequency components lower than the low frequency band cutoff frequency of the acceleration sensor unit 16 so that the difference $F_{dis}'(=F_2-F_1)$ becomes the values other than 0. This causes that (1) a compensating current $I_{cmp}$ is generated in accordance with the $F_{dis}'$, (2) the generated compensating current $I_{cmp}$ further generates the difference $F_{dis}'$ in response to the outputs $F_1$ and $F_2$, and (3) another compensating current $I_{cmp}$ is generated in accordance with the further generated difference $F_{dis}'$ in (2). Such procedures (1) through (3) are carried out repeatedly, thereby resulting in that the linear motor 10 is driven with the foregoing extraordinary amplitudes.

Such a phenomenon that the disturbance observer 17 drives the linear motor 10 excessively causes the collision of the linear motor 10 or the excessive vibrations, and finally presents the problems such as the the damage of the linear motor 10 itself or the optical pickup 4 which is moved by the linear motor 10.

Figure 23:
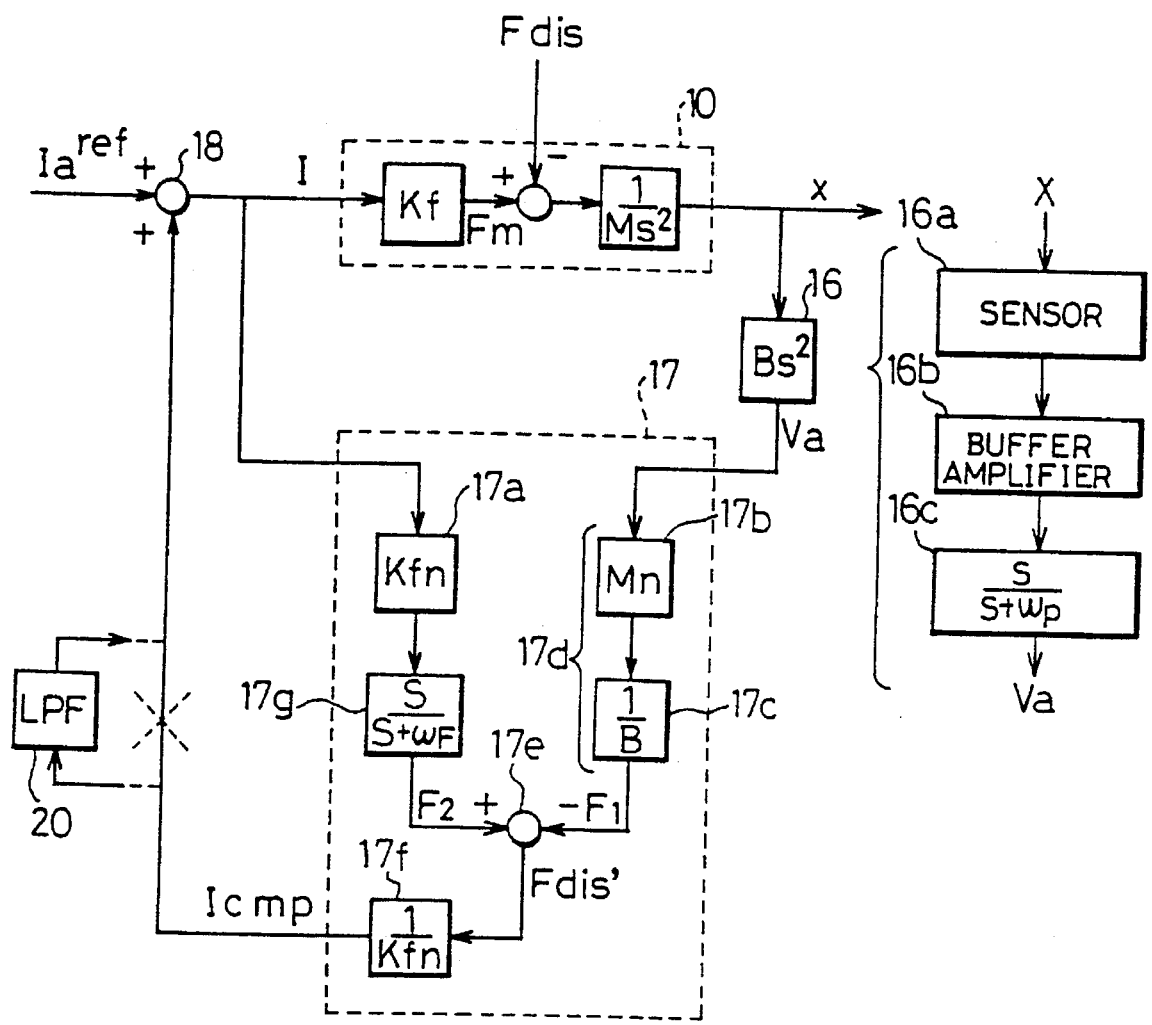
FIG. 23 is a view showing the structure of the fourth embodiment of a motor control device for an information recording and reproducing apparatus of the present invention.

Accordingly, in order to solve the foregoing problems, the motor control device for the information recording and reproducing apparatus in accordance with the fourth embodiment of the present invention, as shown in FIG. 23, is arranged so that the disturbance observer 17 is provided with a high pass filter 17g (adjusting means) between the first block 17a and the comparator 17e. These circuit elements are on the path (the first path) which is formed so as to connect the input side of the driving current I to the comparator 17e.

Figure 24:
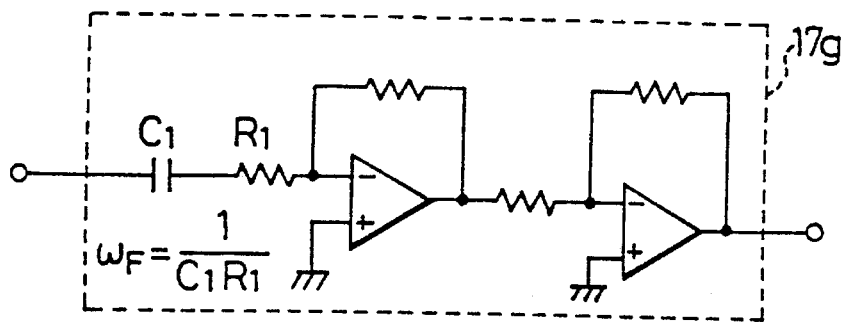
FIG. 24 is a view showing an example in which a high pass filter of the disturbance observer in the above-described motor control device is configured by an electronic circuit.
Figure 25A:
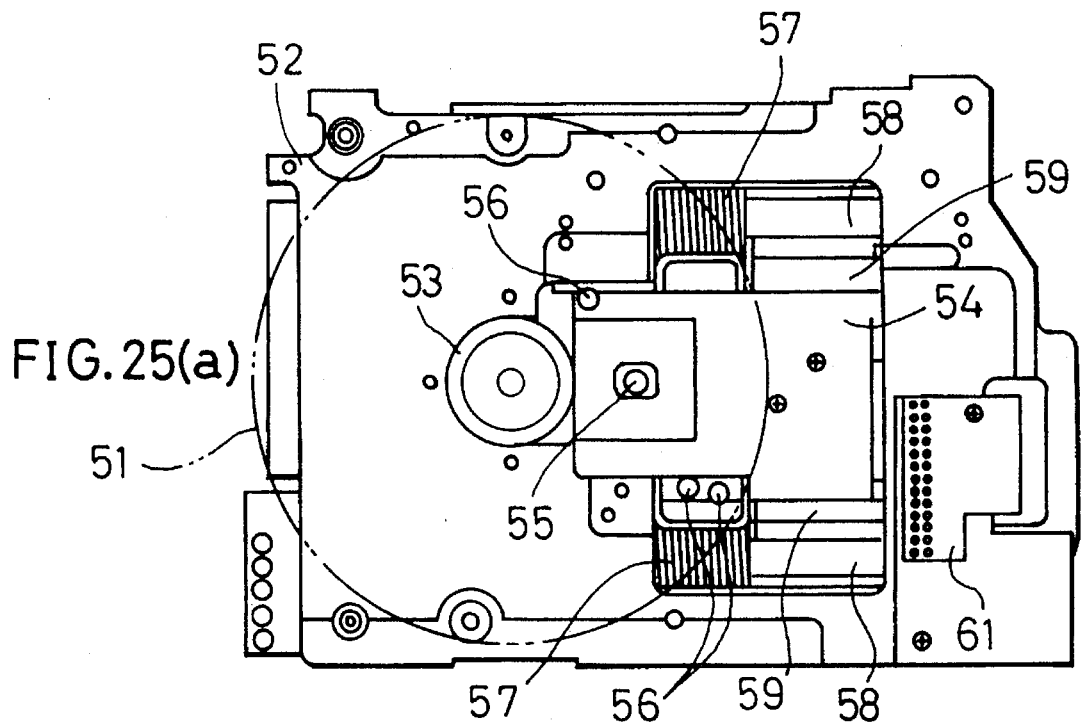
FIG. 25(a) is a plane view showing the structure of a conventional optical disk apparatus.
Figure 25B:
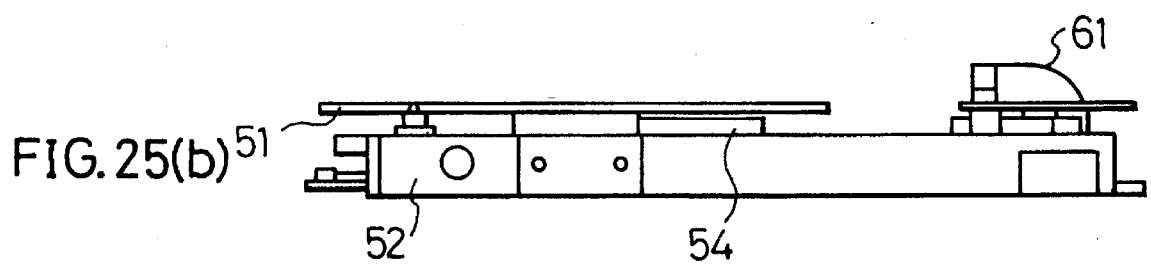
FIG. 25(b) is a front view showing the same.
Figure 26:
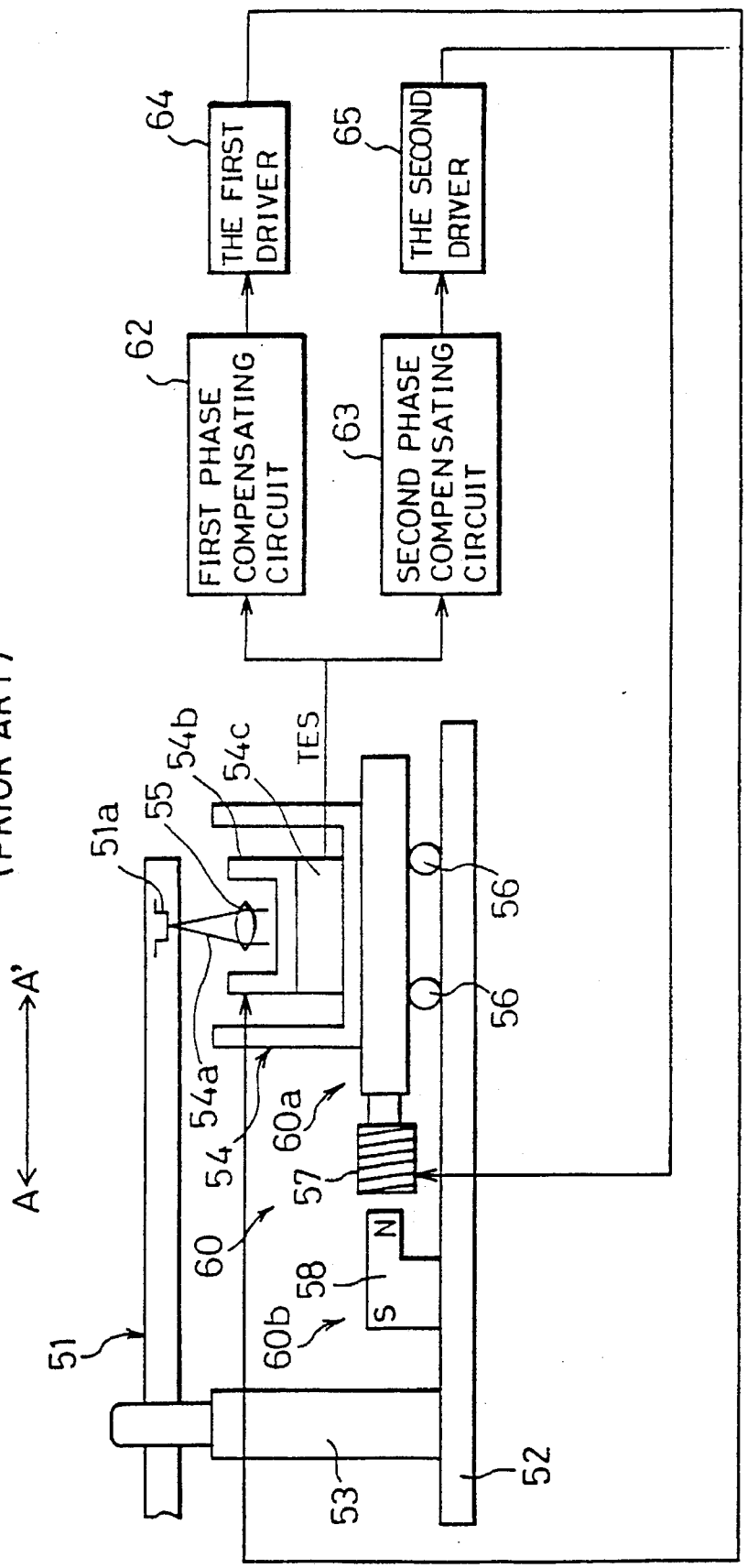
FIG. 26 is a view showing the structure of a tracking servo system by a two-stage servo system in a motor control device of the optical disk apparatus.
Figure 27:
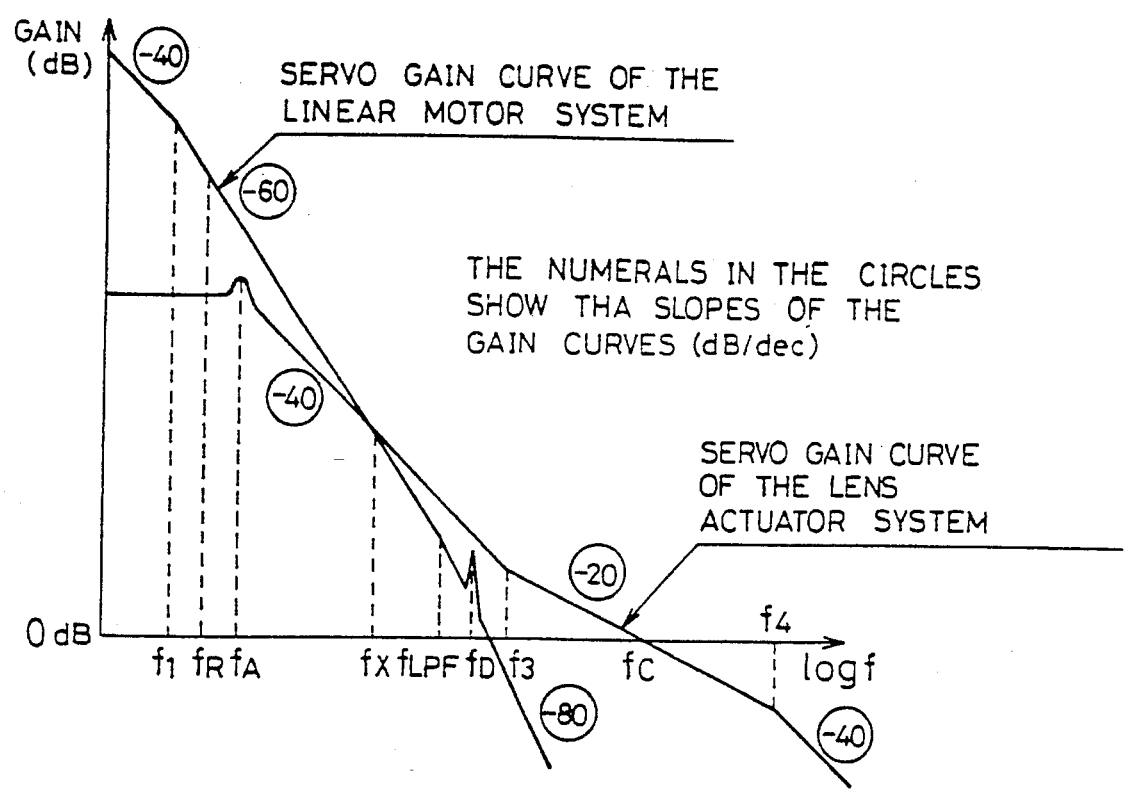
FIG. 27 is a graph showing each servo gain curve of both a linear motor system and a lens actuator system in the tracking servo system.
Figure 28:
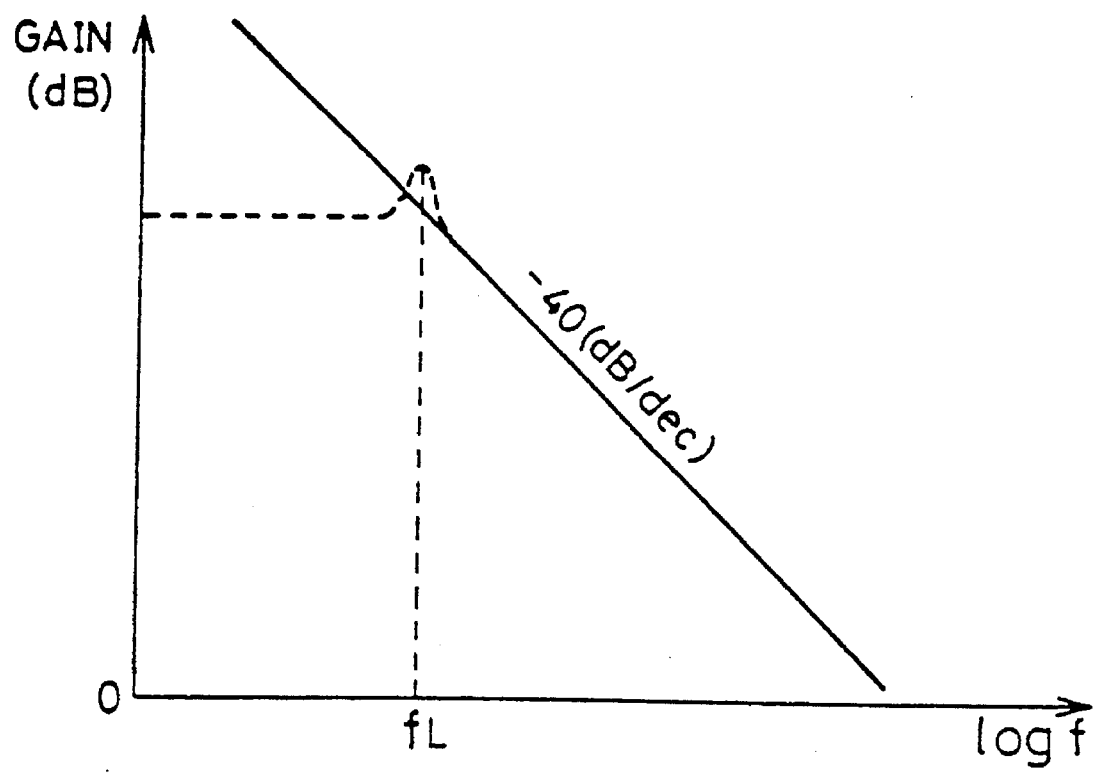
FIG. 28 is a graph showing a variation example of the servo gain curve of the linear motor when variations of the characteristic occur in the linear motor.
Figure 29:
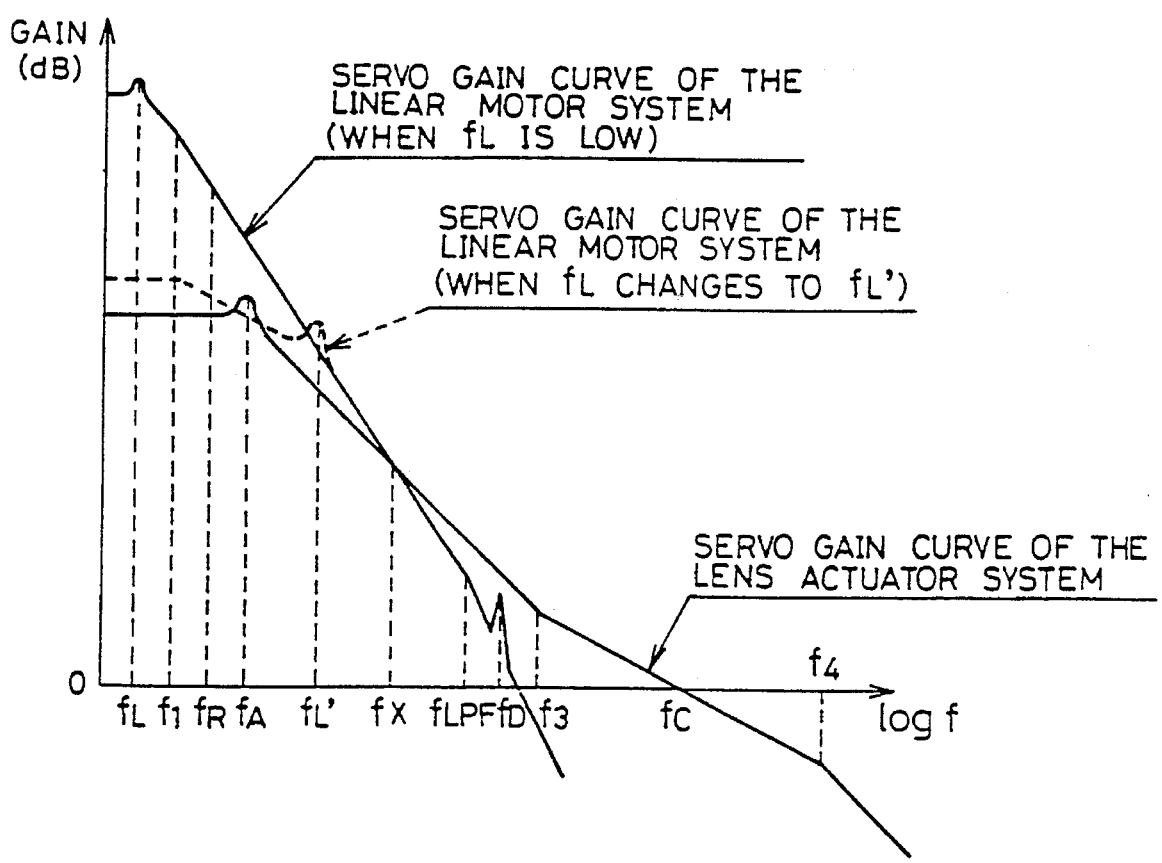
FIG. 29 is a graph showing another variation example of the servo gain curve of the linear motor in a two-stage servo system when the characteristic variations occur in the linear motor.
Figure 30:
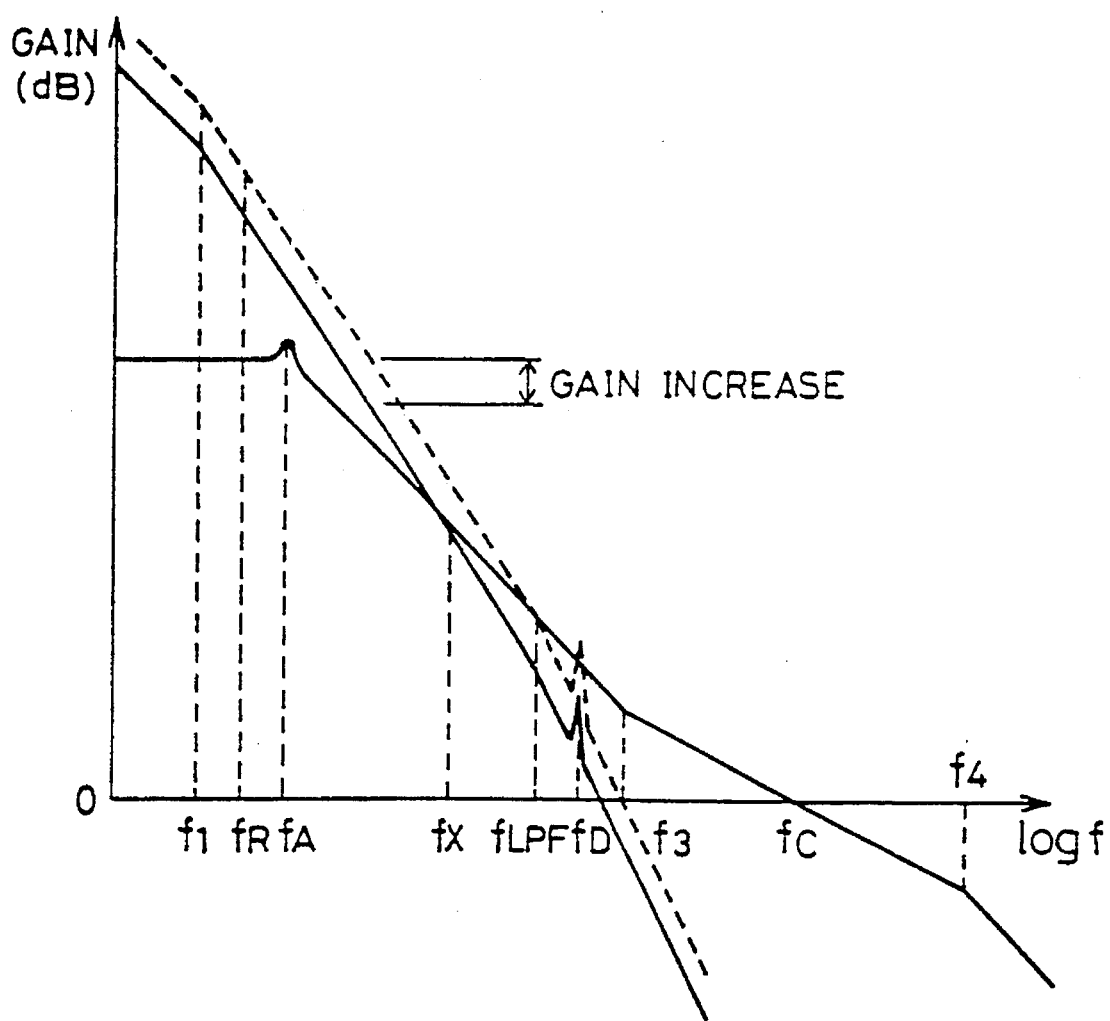
FIG. 30 is a graph showing a variation example of the servo gain curve of the linear motor in a two-stage servo system when the sensitivity is increased in the linear motor.
Figure 31:
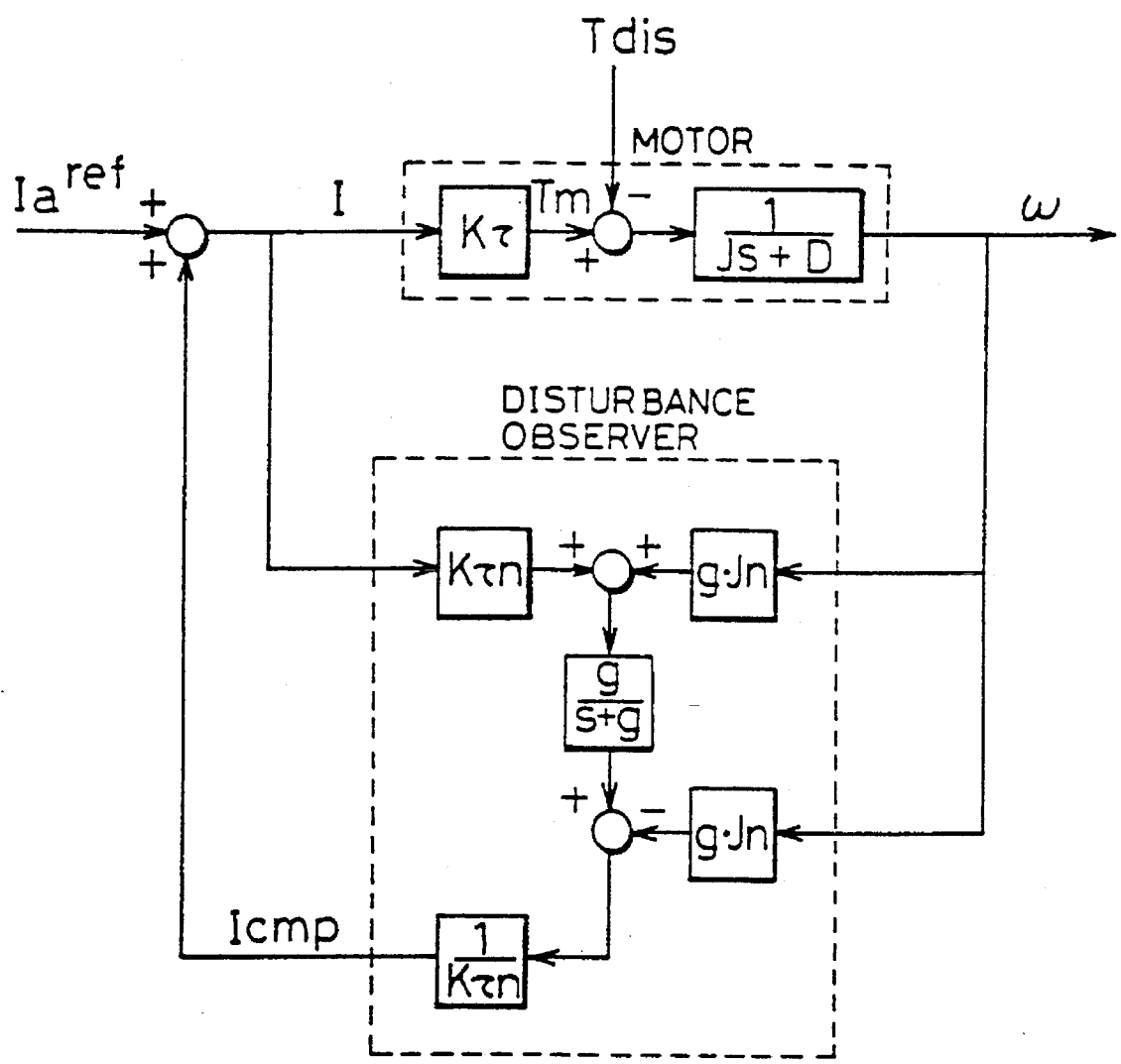
FIG. 31 is a block diagram showing a conventional disturbance observer using a rotary motor.
Figure 32:
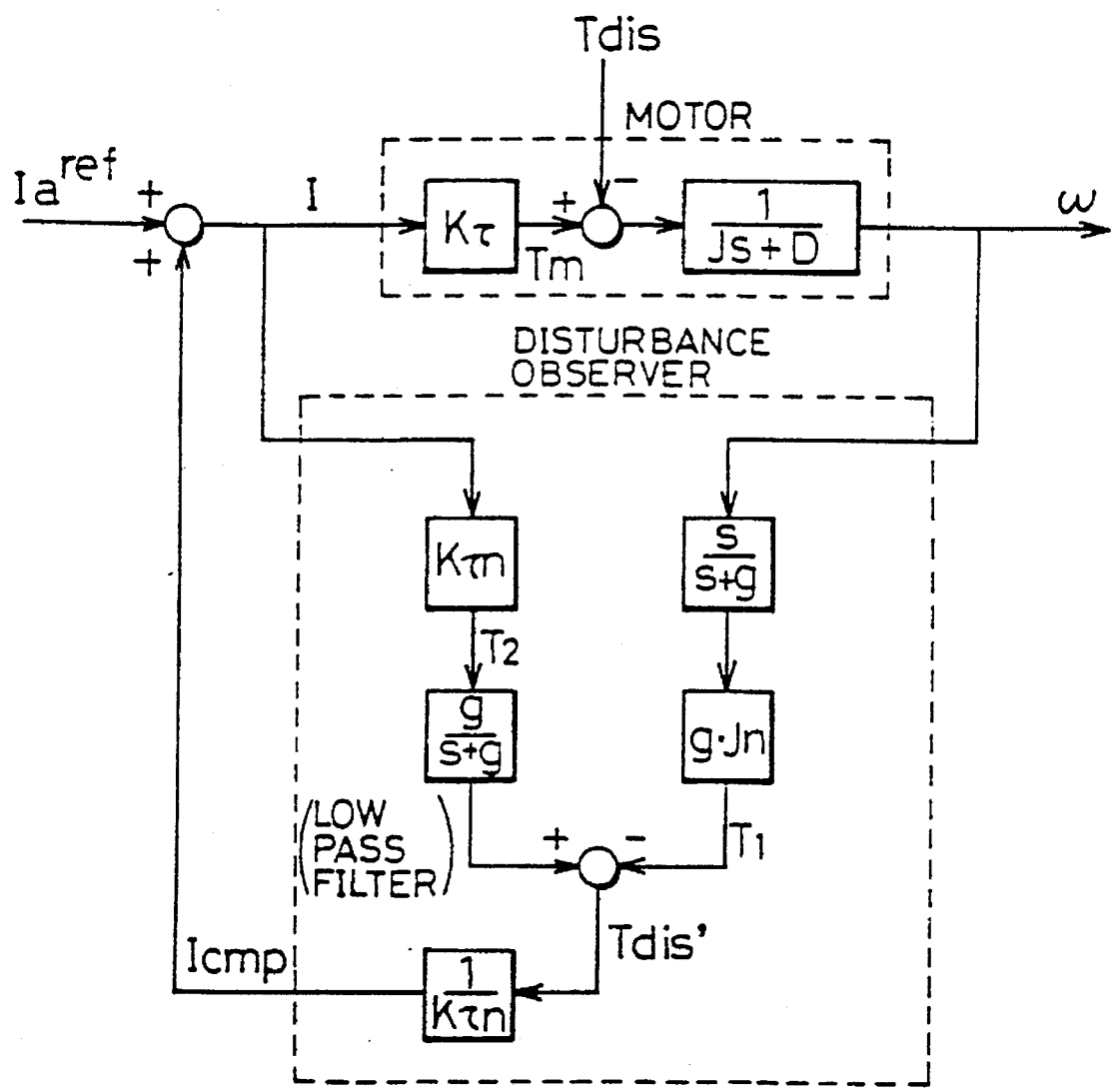
FIG. 32 is a block diagram showing a rewritten diagram of the disturbance observer shown in FIG. 30 by equivalent conversion.

The high pass filter 17g has the low frequency band cutoff angular frequency $\omega_F$, $\omega_F$ being set so as to be substantially equal to the later-described low frequency band cutoff angular frequency $\omega_p$ which is determined by the acceleration sensor 16a and the input resistance of the buffer amplifier 16b. Now, the gain of the high pass filter 17g for the angular frequencies higher than $\omega_F$ is assumed to be 1. As shown in FIG. 24, for example, the high pass filter 17g is configured so that first and second inverting amplifying circuits which use an OP amplifier respectively are connected in series and so that a capacitor is provided with respect to the input of the first inverting amplifying circuit.

As shown in FIG. 23, the acceleration sensor unit 16, which is composed of the acceleration sensor 16a using a piezoelectric element and the buffer amplifier 16b, has the sensitivity of B as a whole. The acceleration sensor unit 16 is assumed to have the fourth block 16c having the low frequency band cutoff characteristic (high pass filter characteristic) generated from the combination of the acceleration sensor 16a and the buffer amplifier 16b.

The fourth block 16c indicates a transfer function $\{s/(s+\omega_p)\}$ of a high pass filter having the low frequency band cutoff characteristic whose low frequency band cutoff angular frequency is $\omega_p$. The low frequency band cutoff angular frequency $\omega_p$ is determined by the input resistance of the buffer amplifier 16b and the capacitance of the acceleration sensor 16a.

The following explanation deals with an effect of the high pass filter 17g and deals with the relationship between the low band cutoff angular frequency $\omega_F$ of the high pass filter 17g and the low band cutoff angular frequency $\omega_p$ in the acceleration sensor unit 16.

It is assumed that $\omega_F$ is much lower than $\omega_p$. The driving current I is applied to the linear motor 10 and the disturbance observer 17 in response to the reference driving current $I_a^{ref}$. Accordingly, $F_2(=K_{fn} \cdot I)$, which is a product of the gain $K_{fn}$ of the first block 17a and the driving current I, is outputted from the first block 17a. The high pass filter 17g passes the frequency components, of higher than $\omega_F$, of the output $F_2$, and the passed frequency components are sent to the comparator 17e.

On the other hand, the movement of the linear motor 10 according to the driving current I is detected by the acceleration sensor 16a. However, the acceleration sensor 16a can not detect the frequency components of lower than $\omega_p$ which is determined by the acceleration sensor 16a and the buffer amplifier 16b. So, the output $F_1$ of the block 17d, which is generated in accordance with the frequency components of lower than $\omega_p$, does not have the components of lower than $\omega_p$.

As already described above, the disturbance observer 17 drives the linear motor 10 so that the output $F_2$ obtained from the driving current I and the output $F_1$ obtained from the output of the acceleration sensor 16a are equal to each other. Therefore, there is the danger that the linear motor 10 is exccesively driven with the frequency components of lower than $\omega_p$ so as to have the foregoing collision.

This indicates that the linear motor 10 exccesively respondes with respect to the frequency components of lower than $\omega_p$ among the reference driving current $I_a^{ref}$. Therefore, when regarding the linear motor 10 as an element of the servo control system, it may be understood as well that the gain of the transfer function is abruptly increased for the frequency components of lower than $\omega_p$. Not only the mechanical resonance characteristic but also such an abrupt change of the transfer characteristic is undesirable for the designing and stabling of the servo control system.

In contrast, it is assumed that the low frequency band cutoff angular frequency $\omega_p$ of the high pass filter 17g is much higher than the low frequency band cutoff angular frequency $\omega_p$ determined by the acceleration sensor 16a and the buffer amplifier 16b. Even when the same reference driving current $I_a^{ref}$ and the driving current I in response thereto, (1) the output $F_2$ obtained from the driving current does not contain the frequency components of lower than $\omega_F$, while (2) the output $F_1$ obtained from the output of the acceleration sensor contain the frequency components $\omega_p$ which is lower than $\omega_F$.

In the light of the operation of the disturbance observer 17 that drives the linear motor 10 so that the output $F_2$ and the $F_1$ are equal to with each other, the movement of the linear motor 10 is suppressed for the frequencies of lower than $\omega_F$. In fact, the output $F_{dis}'(=F_2-F_1)$ of the comparator 17e becomes minus, so this minus signal is applied to the linear motor 10 as the compensating current by which a brake is finally actuated with respect to the linear motor 10.

In such a case, unlike the previous case, there is no danger that the linear motor 10 is excessively driven. However, when regarding the linear motor 10 as an element of the servo control system similarly, according to the present case, the gain of the transfer function of the linear motor 10 is abruptly decreased for the frequencies of lower than $\omega_F$. This is still undesirable for the designing and stability of the servo control system.

The danger that the disturbance observer 17 excessively drives the linear motor 10 without the high pass filter 17g is already described. Even if the high pass filter 17g is provided, the foregoing problems arise and no fruitful results are obtained when the low frequency band cutoff angular frequency $\omega_F$ is much away from the low frequency band cutoff angular frequency $\omega_p$ determined by the acceleration sensor 16a and the buffer amplifier 16b.

However, the frequencies $\omega_p$ and $\omega_F$ need not be set so as to be equal to each other so districtly. It is enough practical if $\omega_F$ falls within about ±20% of $\omega_p$, and that the maximum $\omega_F$ falls within about ±50%.

Note that it is possible to adapt the arrangement of the fourth embodiment to the arrangements of the second and third embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor control device for use in an information recording and reproducing apparatus comprising:

reproducing means for reading out information from a disk-type recording medium;

a motor, having a motor movable section which is moved integrally with the reproducing means and a motor stationary section, for moving the reproducing means along a recording surface of the disk-type recording medium, the motor being driven in accordance with a driving current;

acceleration detecting means for detecting a relative acceleration, of the reproducing means and the motor movable section, with respect to the motor stationary section; and a disturbance observer for generating a compensating signal which compensates a disturbance force and characteristic variation applied to the motor in response to the driving current and an acceleration signal of the acceleration detecting means, and for correcting the driving current in response to the compensating signal.

2. The motor control device as defined in claim 1, wherein the motor is a linear motor.

3. The motor control device as defined in claim 1, wherein the motor is a rotatable swing motor.

4. The motor control device as defined in claim 1, wherein the acceleration detecting means includes a piezoelectric element for converting an amount of mechanical deformation due to the acceleration into an electric signal.

5. The motor control device as defined in claim 1, wherein the acceleration detecting means includes:
- a first acceleration sensor for detecting a first acceleration of the motor movable section;
- a first buffer amplifier, which has an output impedance lower than the first acceleration sensor, receiving an output signal of the first acceleration sensor;
- a second acceleration sensor for detecting a second acceleration of the motor stationary section;
- a second buffer amplifier, which has an output impedance lower than the second acceleration sensor, receiving an output signal of the second acceleration sensor; and
- a subtracter, to which a first output of the first buffer amplifier and a second output of the second buffer amplifier are inputted, for carrying out subtraction of the first and second outputs.

6. The motor control device as defined in claim 1, wherein the acceleration detecting means includes:
- a first acceleration sensor for detecting an acceleration of the motor movable section;
- a second acceleration sensor for detecting an acceleration of the motor stationary section, whose output is connected in reverse series with respect to an output of the first acceleration sensor so that the two outputs are subtracted with each other; and
- a buffer amplifier, which has an output impedance lower than the first and second acceleration sensors, receiving output signals of the first and second acceleration sensors.

7. The motor control device as defined in claim 1, wherein the acceleration detecting means includes:
- a first acceleration sensor for detecting an acceleration of the motor movable section;
- a second acceleration sensor for detecting an acceleration of the motor stationary section, whose output is connected in reverse parallel with respect to an output of the first acceleration sensor so that the two outputs are subtracted with each other; and
- a buffer amplifier, which has an output impedance lower than the first and second acceleration sensors, receiving output signals of the first and second acceleration sensors.

8. A motor control device for use in an information recording and reproducing apparatus comprising:
- recording and reproducing means for recording or reading out information to or from a disk-type recording medium, and for generating a control signal by which the recording and reproducing means is controlled;
- a motor for moving the recording reproducing means along a recording surface of the disk-type recording medium in response to a driving signal which varies depending on the control signal;
- acceleration detecting means for detecting an acceleration of the recording reproducing means which is moved by the motor;
- a disturbance observer, having a first path connecting the driving signal to the generated compensating signal and a second path connecting the acceleration signal detected by the acceleration detecting means to the generated compensating signal, for estimating and generating a compensating signal for compensating a disturbance force applied to the motor and characteristic variation of the motor in accordance with the driving signal and the acceleration signal;
- adding means for correcting the control signal in accordance with the compensating signal of the disturbance observer so as to generate the driving signal; and
- adjusting means, provided on the first path, having a low frequency band cutoff characteristic substantially equal to a low frequency band cutoff characteristic of the acceleration detecting means.

9. The motor control device as defined in claim 8, wherein the adjusting means has a low frequency band cutoff angular frequency indicative of the low frequency band cutoff characteristic of within ±50% of a low frequency band cutoff angular frequency indicative of the low frequency band cutoff characteristic of the acceleration detecting means.

10. The motor control device as defined in claim 9, wherein the adjusting means has a low frequency band cutoff angular frequency indicative of the low frequency band cutoff characteristic of within ±20% of a low frequency band cutoff angular frequency indicative of the low frequency band cutoff characteristic of the acceleration detecting means.

11. The motor control device as defined in claim 1, wherein the acceleration detecting means directly measures an acceleration of the motor movable section.

12. The motor control device as defined in claim 8, wherein the acceleration detecting means directly measures the acceleration of the recording reproducing means.

13. The motor control device as defined in claim 8, wherein the acceleration detecting means includes a piezoelectric element for converting an amount of mechanical deformation due to the acceleration into an electric signal.

* * * * *